US012695555B2

(12) United States Patent
Soltani et al.

(10) Patent No.: US 12,695,555 B2
(45) Date of Patent: Jul. 28, 2026

(54) ENHANCED SECRECY FOR ORTHOGONAL TIME FREQUENCY SPACE (OTFS) WAVEFORMS AT THE PHYSICAL LAYER

(71) Applicant: QUALCOMM Incorporated, San Diego, CA (US)

(72) Inventors: Morteza Soltani, San Diego, CA (US); Jun Ma, San Diego, CA (US); Xiaoxia Zhang, San Diego, CA (US); Raviteja Patchava, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 737 days.

(21) Appl. No.: 17/835,687

(22) Filed: Jun. 8, 2022

(65) Prior Publication Data

US 2023/0403107 A1 Dec. 14, 2023

(51) Int. Cl.
*H04L 5/00* (2006.01)
*H04B 7/06* (2006.01)
(Continued)

(52) U.S. Cl.
CPC ........... *H04L 5/001* (2013.01); *H04B 7/0626* (2013.01); *H04L 5/0057* (2013.01); *H04W 72/23* (2023.01); *H04W 72/543* (2023.01)

(58) Field of Classification Search
CPC ... H04L 5/0048; H04L 5/0023; H04L 5/0055; H04L 5/001; H04L 5/0057;
(Continued)

(56) References Cited

U.S. PATENT DOCUMENTS

2013/0142062 A1* 6/2013 Dinan ................. H04L 27/2601
                                                    370/252
2015/0049713 A1* 2/2015 Lan ....................... H04L 9/0844
                                                    370/329
(Continued)

OTHER PUBLICATIONS

Bloch M., et al., "Physical-Layer Security From Information Theory to Security Engineering", Cambridge University Press, 2011, 14 pages.
(Continued)

*Primary Examiner* — Dady Chery
(74) *Attorney, Agent, or Firm* — QUALCOMM Incorporated

(57) ABSTRACT

Methods, systems, and devices for wireless communications are described. A transmitting device, such as a network entity, may transmit an indication (e.g., via control signaling) to a receiving device, such as a user equipment (UE), indicating that a secure downlink message is scheduled for transmission to the UE. The UE may transmit a sounding reference signal (SRS) to the network entity in response to the control signaling, and the network entity may determine a channel estimate and construct interference based on the channel estimate. The network entity may encode the secure downlink message according to an orthogonal time frequency space (OTFS) precoding scheme and may add the interference to the encoded secure downlink message over a slot duration. The network entity may transmit the encoded secure downlink message, including the added interference, to the UE. The UE may decode the encoded secure downlink message based on the OTFS precoding scheme.

29 Claims, 18 Drawing Sheets

(51) Int. Cl.
  *H04W 72/23*        (2023.01)
  *H04W 72/543*       (2023.01)

(58) Field of Classification Search
  CPC .. H04B 7/0469; H04B 7/0632; H04B 7/0634;
             H04B 7/0626; H04W 36/0058; H04W
                                72/23; H04W 72/543
  See application file for complete search history.

(56)                References Cited

U.S. PATENT DOCUMENTS

| | | | | |
|---|---|---|---|---|
| 2016/0315745 | A1* | 10/2016 | Kim ...................... | H04L 5/0023 |
| 2022/0046608 | A1* | 2/2022 | Dinan ................... | H04W 72/23 |
| 2022/0271802 | A1* | 8/2022 | Lee ....................... | H04B 17/11 |

OTHER PUBLICATIONS

Goel S., et al., "Guaranteeing Secrecy Using Artificial Noise", IEEE
Transactions on Wireless Communications, vol. 7, No. 6, Jun. 2008,
pp. 2180-2189.
Hadani R., et al., "Orthogonal Time Frequency Space Modulation",
Proc. IEEE Wcnc, San Francisco, Ca, USA, Mar. 2017, 6 pages.
Mukherjee A., et al., "Principles of Physical Layer Security in
Multiuser Wireless Networks: A Survey", IEEE Communications
Surveys & Tutorials, 2014, vol. 16, No. 3, pp. 1550-1573, Third
Quarter 2014, pp. 1-24.

* cited by examiner

130

105

115

Network
Entity

Transceiver

1010

Antenna

1015

Communications
Manager

1020

Memory

Code

1030

1025

1040

Processor

1035

1005

1000

1110          1120          1115

1105

1100

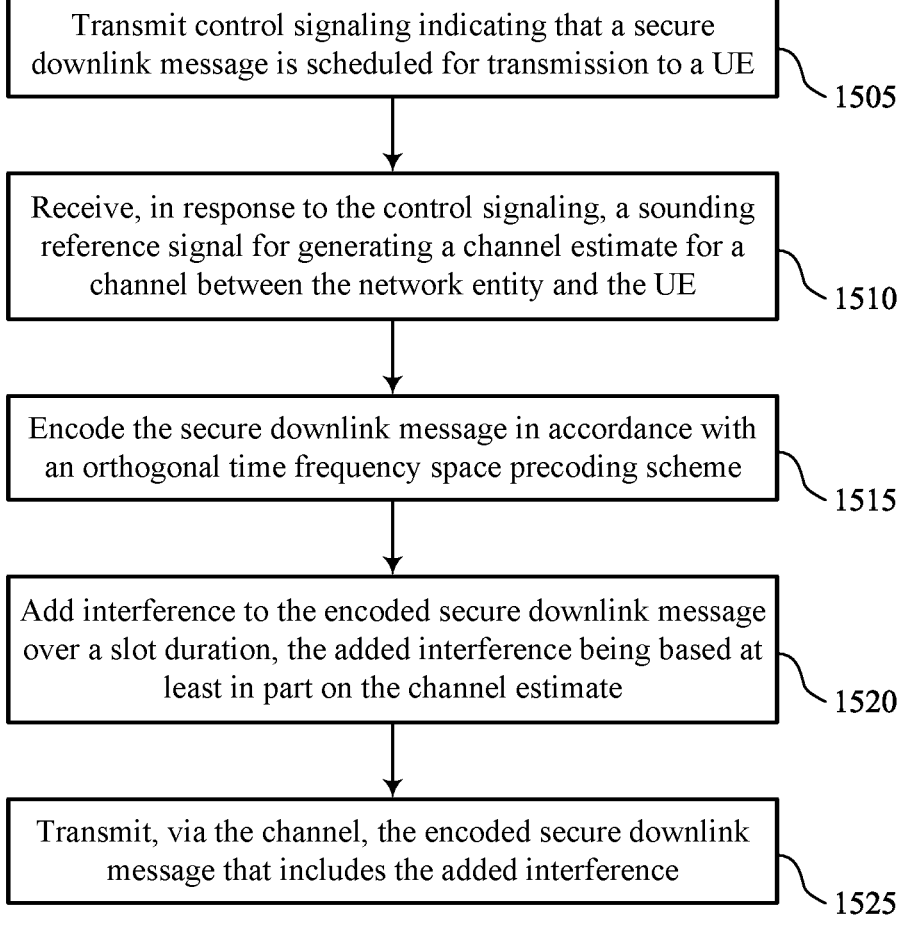

Transmit control signaling indicating that a secure downlink message is scheduled for transmission to a UE

1505

Receive, in response to the control signaling, a sounding reference signal for generating a channel estimate for a channel between the network entity and the UE

1510

Encode the secure downlink message in accordance with an orthogonal time frequency space precoding scheme

1515

Add interference to the encoded secure downlink message over a slot duration, the added interference being based at least in part on the channel estimate

1520

Transmit, via the channel, the encoded secure downlink message that includes the added interference

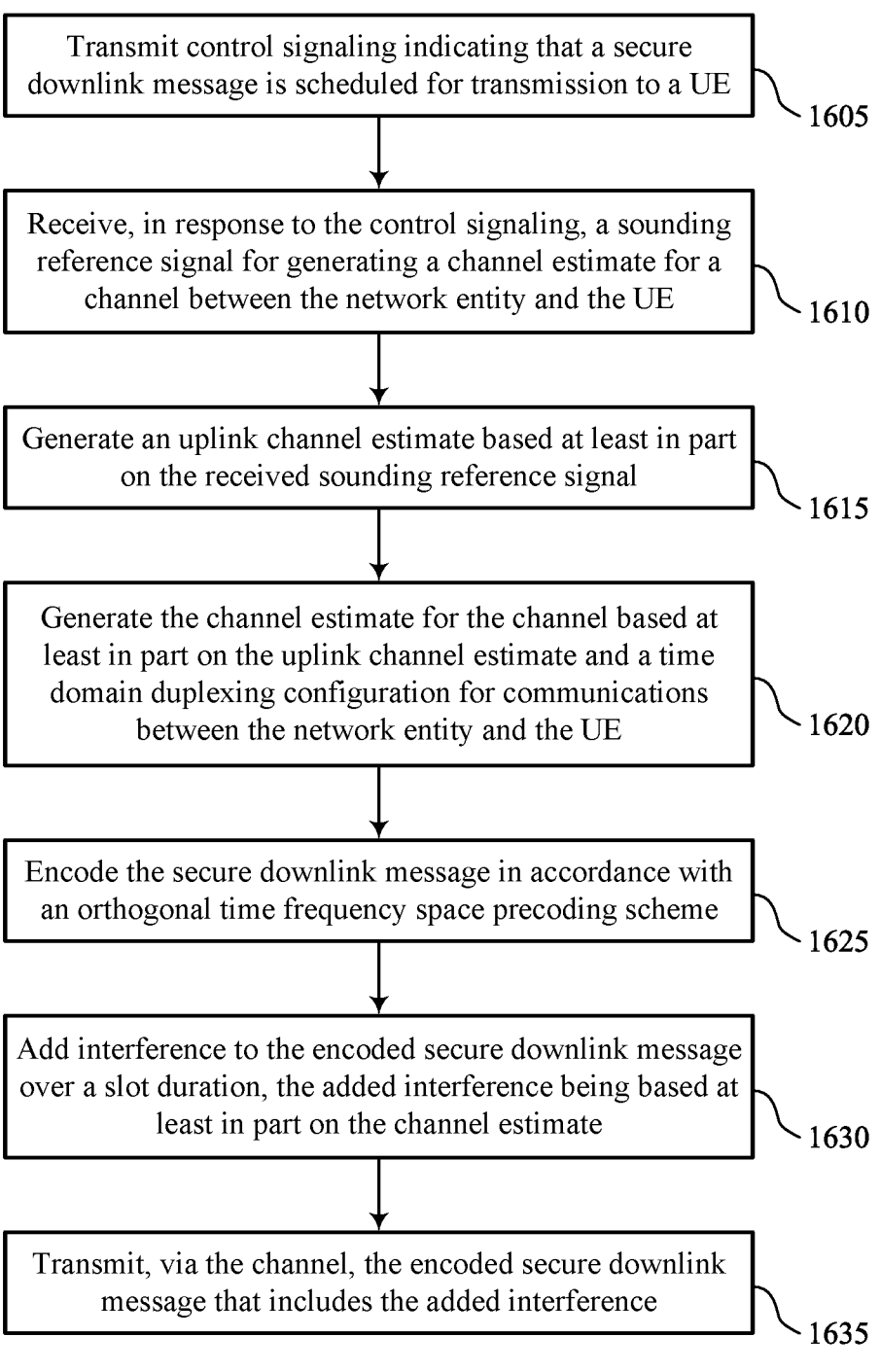

Transmit control signaling indicating that a secure downlink message is scheduled for transmission to a UE

1605

Receive, in response to the control signaling, a sounding reference signal for generating a channel estimate for a channel between the network entity and the UE

1610

Generate an uplink channel estimate based at least in part on the received sounding reference signal

1615

Generate the channel estimate for the channel based at least in part on the uplink channel estimate and a time domain duplexing configuration for communications between the network entity and the UE

1620

Encode the secure downlink message in accordance with an orthogonal time frequency space precoding scheme

1625

Add interference to the encoded secure downlink message over a slot duration, the added interference being based at least in part on the channel estimate

1630

Transmit, via the channel, the encoded secure downlink message that includes the added interference

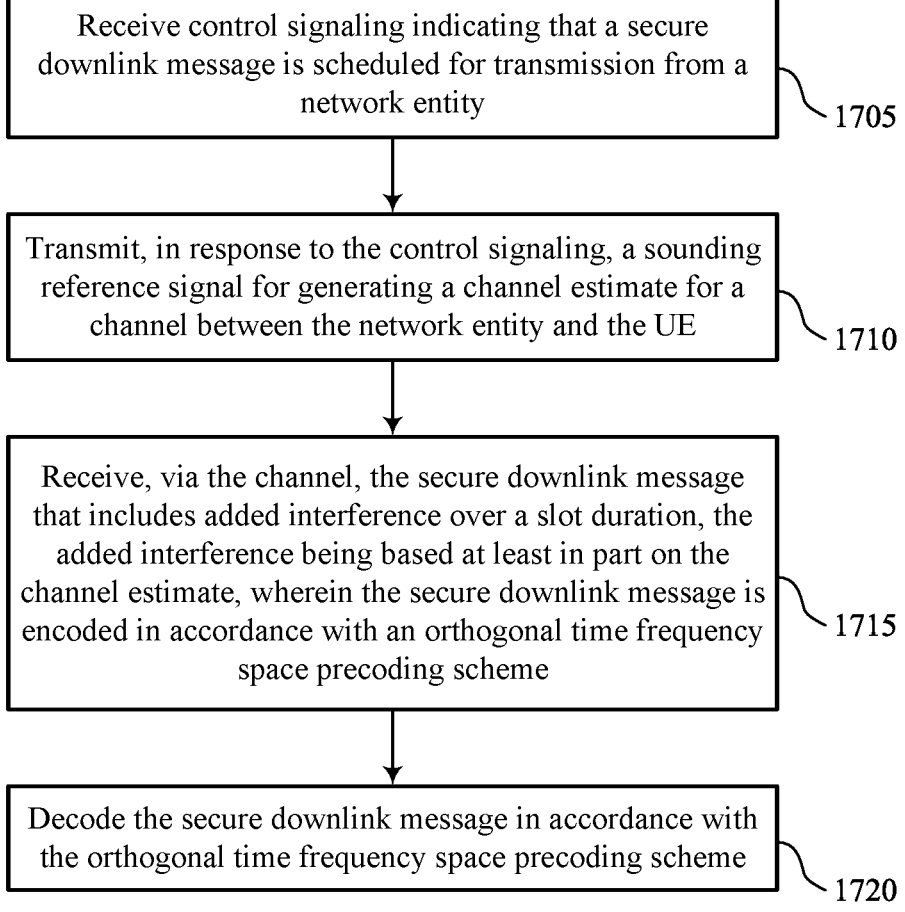

Receive control signaling indicating that a secure downlink message is scheduled for transmission from a network entity

1705

Transmit, in response to the control signaling, a sounding reference signal for generating a channel estimate for a channel between the network entity and the UE

1710

Receive, via the channel, the secure downlink message that includes added interference over a slot duration, the added interference being based at least in part on the channel estimate, wherein the secure downlink message is encoded in accordance with an orthogonal time frequency space precoding scheme

1715

Decode the secure downlink message in accordance with the orthogonal time frequency space precoding scheme

ENHANCED SECRECY FOR ORTHOGONAL TIME FREQUENCY SPACE (OTFS) WAVEFORMS AT THE PHYSICAL LAYER

FIELD OF TECHNOLOGY

The following relates to wireless communications, including enhanced secrecy for orthogonal time frequency space (OTFS) waveforms at the physical layer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications may be susceptible to security threats from unauthorized receivers. For example, a device may transmit confidential information, but may be unable to control whether a malicious or otherwise unauthorized receiver intercepts the transmission (which may be referred to as "eavesdropping"). To improve security and maintain secrecy of a transmission, the device may implement cryptographic approaches (e.g., secret key sharing) at higher layers (e.g., application layers), such that a receiver without a correct key may be unable to decode a captured message. However, such methods may still fail to prevent an unauthorized receiver from intercepting and decoding the transmission.

SUMMARY

The described techniques relate to improved methods, systems, devices, and apparatuses that support enhanced secrecy for orthogonal time frequency space (OTFS) waveforms at the physical layer. Generally, the described techniques provide for a transmitting device, such as a network entity (e.g., a base station), to generate and add interference to a secure downlink message that is encoded using an OTFS precoding scheme. The network entity may generate the added interference based on an estimation of the channel between the network entity and an intended receiving device (e.g., a user equipment (UE)). Accordingly, unauthorized devices attempting to eavesdrop on communications between the network entity and the UE may be unable to decode the secure downlink message (e.g., due to the added interference) without knowledge of the channel.

In some examples, the network entity may transmit a message (e.g., via control signaling) to the UE indicating that a secure downlink message is scheduled for transmission to the UE. The UE may transmit a sounding reference signal (SRS) to the network entity in response to the control signaling, such that the network entity may determine a channel estimate (e.g., the network entity may estimate an uplink channel using the SRS and then determine a similar downlink channel estimate based on the uplink channel). The network entity may construct interference to be added to the secure downlink message based on the channel estimation. The network entity may encode the secure downlink message according to an OTFS precoding scheme and add the interference to the encoded secure downlink message over a slot duration (e.g., the interference may be added to an entire slot of the downlink message). The network entity may transmit the encoded secure downlink message, including the added interference, to the UE. In such cases, the UE may decode the encoded secure downlink message without being affected by the added interference (e.g., based on the design of the interference itself), whereas an eavesdropping device may receive a message that is affected by the interference, impacting the eavesdropping device's ability to decode the message and therefore enhancing the security of the message.

A method for wireless communications at a network entity is described. The method may include transmitting control signaling indicating that a secure downlink message is scheduled for transmission to a UE, receiving, in response to the control signaling, a sounding reference signal for generating a channel estimate for a channel between the network entity and the UE, encoding the secure downlink message in accordance with an OTFS precoding scheme, adding interference to the encoded secure downlink message over a slot duration, the added interference being based on the channel estimate, and transmitting, via the channel, the encoded secure downlink message that includes the added interference.

An apparatus for wireless communications at a network entity is described. The apparatus may include a processor, memory coupled with the processor, and instructions stored in the memory. The instructions may be executable by the processor to cause the apparatus to transmit control signaling indicating that a secure downlink message is scheduled for transmission to a UE, receive, in response to the control signaling, an SRS for generating a channel estimate for a channel between the network entity and the UE, encode the secure downlink message in accordance with an OTFS precoding scheme, add interference to the encoded secure downlink message over a slot duration, the added interference being based on the channel estimate, and transmit, via the channel, the encoded secure downlink message that includes the added interference.

Another apparatus for wireless communications at a network entity is described. The apparatus may include means for transmitting control signaling indicating that a secure downlink message is scheduled for transmission to a UE, means for receiving, in response to the control signaling, an SRS for generating a channel estimate for a channel between the network entity and the UE, means for encoding the secure downlink message in accordance with an OTFS precoding scheme, means for adding interference to the encoded secure downlink message over a slot duration, the added interference being based on the channel estimate, and means for transmitting, via the channel, the encoded secure downlink message that includes the added interference.

A non-transitory computer-readable medium storing code for wireless communications at a network entity is described. The code may include instructions executable by a processor to transmit control signaling indicating that a secure downlink message is scheduled for transmission to a UE, receive, in response to the control signaling, an SRS for generating a channel estimate for a channel between the network entity and the UE, encode the secure downlink message in accordance with an OTFS precoding scheme, add interference to the encoded secure downlink message over a slot duration, the added interference being based on the channel estimate, and transmit, via the channel, the encoded secure downlink message that includes the added interference.

Some examples of the method, apparatuses, and non-transitory computer-readable medium described herein may further include operations, features, means, or instructions for transmitting a CSI-RS, receiving a feedback message based on the CSI-RS, and determining one or more calibration coefficients based on the feedback message and the channel estimate, where encoding the secure downlink message may be based on the one or more calibration coefficients.

In some examples of the method, apparatuses, and non-transitory computer-readable medium described herein, the one or more calibration coefficients may be associated with a ratio of a first gain value to a second gain value, the first gain value including a product of a transmission channel gain at the network entity and a reception channel gain at the UE, and the second gain value including a product of a transmission channel gain at the UE and a reception channel gain at the network entity.

Some examples of the method, apparatuses, and non-transitory computer-readable medium described herein may further include operations, features, means, or instructions for generating an uplink channel estimate based on the received SRS and generating the channel estimate for the channel based on the uplink channel estimate and a TDD configuration for communications between the network entity and the UE.

In some examples of the method, apparatuses, and non-transitory computer-readable medium described herein, the added interference may be associated with a null space of a product of a first matrix and a second matrix, the first matrix being representative of the channel estimate and the second matrix corresponding to a cyclic prefix removal matrix.

In some examples of the method, apparatuses, and non-transitory computer-readable medium described herein, the added interference includes a product of a vector and third matrix and the third matrix spans the null space of the product of the first matrix and the second matrix.

In some examples of the method, apparatuses, and non-transitory computer-readable medium described herein, the vector includes one or more values that may be randomly-generated.

In some examples of the method, apparatuses, and non-transitory computer-readable medium described herein, the vector includes one or more values that may be preconfigured.

In some examples of the method, apparatuses, and non-transitory computer-readable medium described herein, the control signaling includes RRC signaling.

In some examples of the method, apparatuses, and non-transitory computer-readable medium described herein, the control signaling includes DCI.

In some examples of the method, apparatuses, and non-transitory computer-readable medium described herein, the control signaling includes a MAC-CE.

In some examples of the method, apparatuses, and non-transitory computer-readable medium described herein, the encoded secure downlink message includes control signaling, data signaling, a demodulation reference signal, or a combination thereof.

Some examples of the method, apparatuses, and non-transitory computer-readable medium described herein may further include operations, features, means, or instructions for generating the channel estimate in accordance with a delay-Doppler domain channel estimation scheme.

A method for wireless communications at a UE is described. The method may include receiving control signaling indicating that a secure downlink message is scheduled for transmission from a network entity, transmitting, in response to the control signaling, an SRS for generating a channel estimate for a channel between the network entity and the UE, receiving, via the channel, the secure downlink message that includes added interference over a slot duration, the added interference being based on the channel estimate, where the secure downlink message is encoded in accordance with an OTFS precoding scheme, and decoding the secure downlink message in accordance with the OTFS precoding scheme.

An apparatus for wireless communications at a UE is described. The apparatus may include a processor, memory coupled with the processor, and instructions stored in the memory. The instructions may be executable by the processor to cause the apparatus to receive control signaling indicating that a secure downlink message is scheduled for transmission from a network entity, transmit, in response to the control signaling, an SRS for generating a channel estimate for a channel between the network entity and the UE, receive, via the channel, the secure downlink message that includes added interference over a slot duration, the added interference being based on the channel estimate, where the secure downlink message is encoded in accordance with an OTFS precoding scheme, and decode the secure downlink message in accordance with the OTFS precoding scheme.

Another apparatus for wireless communications at a UE is described. The apparatus may include means for receiving control signaling indicating that a secure downlink message is scheduled for transmission from a network entity, means for transmitting, in response to the control signaling, an SRS for generating a channel estimate for a channel between the network entity and the UE, means for receiving, via the channel, the secure downlink message that includes added interference over a slot duration, the added interference being based on the channel estimate, where the secure downlink message is encoded in accordance with an OTFS precoding scheme, and means for decoding the secure downlink message in accordance with the OTFS precoding scheme.

A non-transitory computer-readable medium storing code for wireless communications at a UE is described. The code may include instructions executable by a processor to receive control signaling indicating that a secure downlink message is scheduled for transmission from a network entity, transmit, in response to the control signaling, an SRS for generating a channel estimate for a channel between the network entity and the UE, receive, via the channel, the secure downlink message that includes added interference over a slot duration, the added interference being based on the channel estimate, where the secure downlink message is encoded in accordance with an OTFS precoding scheme, and decode the secure downlink message in accordance with the OTFS precoding scheme.

Some examples of the method, apparatuses, and non-transitory computer-readable medium described herein may further include operations, features, means, or instructions for receiving one or more CSI-RSs, generating a downlink channel estimate for the channel based on the received one or more CSI-RSs, and transmitting a feedback message indicating the downlink channel estimate for one or more calibration coefficients applied to the channel estimate.

Some examples of the method, apparatuses, and non-transitory computer-readable medium described herein may further include operations, features, means, or instructions for receiving, with the secure downlink message, one or more CSI-RSs and determining one or more calibration coefficients based on a downlink channel estimate generated using the one or more CSI-RSs, where decoding the secure downlink message may be based on the one or more calibration coefficients.

In some examples of the method, apparatuses, and non-transitory computer-readable medium described herein, the one or more calibration coefficients may be associated with a ratio of a first gain value to a second gain value, the first gain value including a product of a transmission channel gain at the network entity and a reception channel gain at the UE, and the second gain value including a product of a transmission channel gain at the UE and a reception channel gain at the network entity.

In some examples of the method, apparatuses, and non-transitory computer-readable medium described herein, the added interference may be associated with a null space of a product of a first matrix and a second matrix, the first matrix being representative of the channel estimate and the second matrix corresponding to a cyclic prefix removal matrix.

In some examples of the method, apparatuses, and non-transitory computer-readable medium described herein, the added interference includes a product of a vector and third matrix and the third matrix spans the null space of the product of the first matrix and the second matrix.

In some examples of the method, apparatuses, and non-transitory computer-readable medium described herein, the vector includes one or more values that may be randomly-generated.

In some examples of the method, apparatuses, and non-transitory computer-readable medium described herein, the vector includes one or more values that may be preconfig-ured.

In some examples of the method, apparatuses, and non-transitory computer-readable medium described herein, the control signaling includes RRC signaling.

In some examples of the method, apparatuses, and non-transitory computer-readable medium described herein, the control signaling includes DCI.

In some examples of the method, apparatuses, and non-transitory computer-readable medium described herein, the control signaling includes a MAC-CE.

In some examples of the method, apparatuses, and non-transitory computer-readable medium described herein, the secure downlink message includes control signaling, data signaling, a demodulation reference signal, or a combination thereof.

BRIEF DESCRIPTION OF THE DRAWINGS

FIGS. 15 through 18 show flowcharts illustrating methods that support enhanced secrecy for OTFS waveforms at the physical layer in accordance with one or more aspects of the present disclosure.

DETAILED DESCRIPTION

Figure 1:
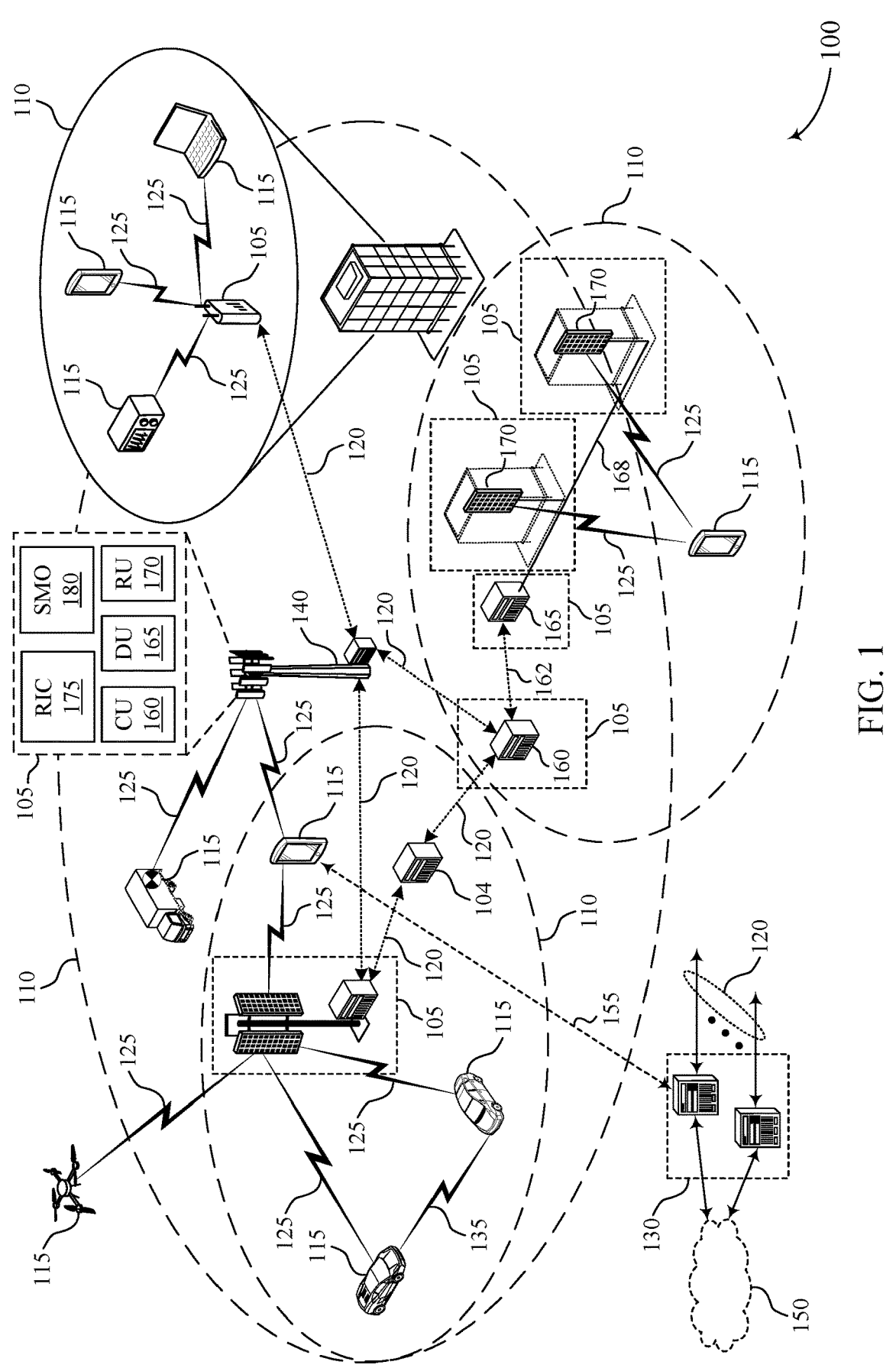
FIGS. 1 and 2 illustrate examples of wireless communications systems that support enhanced secrecy for orthogonal time frequency space (OTFS) waveforms at the physical layer in accordance with one or more aspects of the present disclosure.

Some wireless communications systems may support the use of security methods to protect the secrecy of confidential transmissions. For example, with cryptographic security methods, such as secret key sharing, a transmitting device may encrypt a transmission with a secret key and an intended receiving device may decrypt the transmission using the secret key. However, an unauthorized receiver may intercept the transmission (which may be referred to as "eavesdropping") and, if the unauthorized receiver obtains or decrypts the secret key, the unauthorized received may be able to access confidential information. Additionally, some cryptographic methods may increase overhead and may require significant computational complexity, and some intended receivers may be incapable of encryption or decryption.

With physical-layer security approaches, the transmitting device may rely on characteristics of a channel between the transmitting device and an intended receiving device to maintain transmission secrecy. For example, the transmitting device may exploit the inherent randomness of the channel by constructing interference (e.g., artificial noise) based on a channel estimate and adding the constructed interference to a confidential transmission. Because the added interference is based on the channel, the added interference may not negatively impact reception at the intended receiving device (e.g., the intended receiving device may successfully decode the confidential transmission). In contrast, the added interference may destructively affect the confidential transmission at an unauthorized receiver due to differences in a channel between the unauthorized receiver and the transmitter. As such, the unauthorized receiver may be unable to extract information from the confidential transmission.

However, channel-based physical-layer security methods may be deficient when a channel varies rapidly over time (e.g., in high-Doppler spread scenarios, or if a device is in a high-mobility state). That is, characteristics of the channel determined by the channel estimate may be constant for a relatively short time period, such that added interference based on the channel estimate may only provide security for that time period. Additionally, the varying nature of the channel may introduce additional resource consumption and delay. For example, a transmitting device may receive a reference signal and determine a channel estimate for every secure transmission; as a number of secure transmissions increases, the overhead (e.g., due to reference signal transmission) and latency (e.g., due to performing channel estimation) may also increase.

Accordingly, the techniques described herein provide physical-layer security in scenarios with varying channel characteristics, such as high-mobility or high-Doppler spread scenarios (e.g., high-speed train scenarios). A transmitting device (e.g., a network entity, such as a base station) may use orthogonal time frequency space (OTFS) precoding for secure downlink transmissions and may add channel estimation-based interference to a secure downlink message to prevent eavesdroppers from decoding the message. OTFS precoding schemes are based on a delay-Doppler domain of a channel (e.g., rather than a time-frequency domain), which in turn depends on geometric, environmental conditions of the channel. Put another way, the delay-Doppler domain characteristics of a channel may be constant for a relatively longer time period than the time-frequency domain characteristics of the channel. As such, interference added to an OTFS-encoded message may provide security despite changes in the channel over time.

For example, a network device may transmit an indication (e.g., via control signaling) to an intended receiver, such as a user equipment (UE), that a secure downlink message is scheduled for transmission to the UE. In response, the UE may transmit a sounding reference signal (SRS) to the network device. The network device may use the SRS to generate a channel estimate for the uplink channel between the network device and the UE. The network device may determine a downlink channel estimation based on channel reciprocity (e.g., based on time-division duplexing (TDD) communications) between the uplink channel and the downlink channel. The network device may encode the secure downlink message using an OTFS precoding scheme. As part of the OTFS precoding, the network device may place information symbols of the secure downlink message in a delay-Doppler domain, precode the information symbols via an inverse symplectic Fast Fourier transform (ISFFT) to place the information symbols in an orthogonal frequency division multiplexing (OFDM) domain, and append a cyclic prefix to a time-domain signal. The network device may construct (e.g., calculate, compute) interference based on the downlink channel estimation, and the network device may add the interference to the secure downlink message over a slot duration before transmitting the secure downlink message in the time-frequency domain. The UE may correspondingly receive the secure downlink message in the time-frequency domain and decode the message via a symplectic Fast Fourier transform (SFFT) to convert the information symbols back to the delay-Doppler domain. Because the interference is based on the downlink channel estimation, the UE may not experience interference when decoding and processing the received secure downlink message.

Particular implementations of the subject matter described in this disclosure can be implemented to realize one or more of the following potential advantages. For example, by adding channel-based interference to OTFS waveforms, the network device and the UE may maintain confidentiality via physical-layer security even in high-Doppler or high-mobility scenarios. Additionally, due to characteristics of OTFS waveforms (e.g., slow channel variations), the techniques described herein may avoid increased processing, overhead, and delays associated with channel-based physical-layer security methods applied to OFDM waveforms in high-Doppler situations. The described techniques thus provide for increased security and improved reliability for wireless communications while reducing power consumption, reducing system latency, and increasing efficient utilization of communication resources, among other benefits, across various and diverse deployment scenarios.

Aspects of the disclosure are initially described in the context of wireless communications systems. Aspects of the disclosure are then discussed with reference to a coding scheme, a process diagram, a signaling diagram, and a process flow. Aspects of the disclosure are further illustrated by and described with reference to apparatus diagrams, system diagrams, and flowcharts that relate to enhanced secrecy for OTFS waveforms at the physical layer.

FIG. 1 illustrates an example of a wireless communications system 100 that supports enhanced secrecy for OTFS waveforms at the physical layer in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support enhanced secrecy for OTFS waveforms at the physical layer as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency-division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support physical-layer security schemes between a network entity 105, such as a base station 140, and UEs 115 and/or between UEs 115. In some cases, these physical-layer security schemes may rely on a position of a receiving device (e.g., a UE 115) relative to a transmitting device (e.g., a network entity 105), and a channel between the UE 115 and the network entity 105. As the position of the UE 115 relative to the network entity 105 may impact the channel and its associated various channel characteristics, the use of channel estimation may improve security within the wireless communications system 100. For example, the network entity 105 may determine interference to add to a downlink transmission based on a channel estimate for the channel between the UE 115 and the network entity 105. Because the added interference is based on the channel, the downlink transmission received at the UE 115 may be unaffected by the added interference. That is, various UEs 115 may experience different channel characteristics due to differences in position relative to the network entity 105. A UE 115 that is in a different position (e.g., has a different channel between itself and the network entity 105) may experience the added interference destructively. Accordingly, the added interference may secure the downlink transmission by preventing other UEs 115 from successfully capturing or decoding the downlink transmission.

The techniques described herein support physical-layer security for OTFS communications (e.g., communications transmitted or received via OTFS waveforms). For example, a network entity 105 may transmit control signaling (e.g., radio resource control (RRC) signaling, downlink control information (DCI), a medium access control (MAC) control element (MAC-CE), or the like) to a UE 115 indicating that a secure downlink message (e.g., is to be transmitted to the UE 115. Based on receiving the control signaling, the UE 115 may transmit a reference signal, such as a sounding reference signal (SRS), to the network entity 105. The network entity 105 may generate a channel estimate for a channel between the network entity 105 and the UE 115. For example, the network entity 105 may generate an uplink channel estimate based on the received SRS, and may generate a downlink channel estimate based on the uplink channel estimate and assuming channel reciprocity (e.g., for time-division duplexing (TDD) communications).

The network entity 105 may use the channel estimate (e.g., the downlink channel estimate) to construct interference to add to the secure downlink message. More specifically, the network entity 105 may determine or otherwise identify a matrix representation of the channel estimate and a cyclic prefix removal matrix, and the network entity 105 may construct a vector representation of the interference. In such cases, the vector representation may be associated with a null space of a product of the channel estimate matrix and the cyclic prefix removal matrix. The network entity 105 may encode the secure downlink message in accordance with an OTFS precoding scheme and may add the interference to the OTFS encoded secure downlink message over a slot duration. The network entity 105 may transmit the encoded secure downlink message, including the added interference, to the UE 115.

The UE 115, upon receiving the OTFS encoded secure downlink message with the added interference, may apply the cyclic prefix removal matrix. As the vector representation of the added interference is associated with the null space of the product of the channel estimate matrix and the cyclic prefix removal matrix, application of the cyclic prefix removal matrix to the received signal may cancel or negate the added interference at the UE 115 (e.g., based on the design of the additive interference). As such, the UE 115 may receive and decode (e.g., in accordance with the OTFS precoding scheme) the secure downlink transmission without experiencing the interference. However, for any other device (such as a different UE 115) attempting to intercept (e.g., capture or steal) the secure downlink transmission, the interference may be destructive, and may therefore obstruct the other device from receiving or decoding the secure downlink transmission. Accordingly, the added interference may provide enhanced physical-layer security for the secure downlink transmission.

Figure 2:
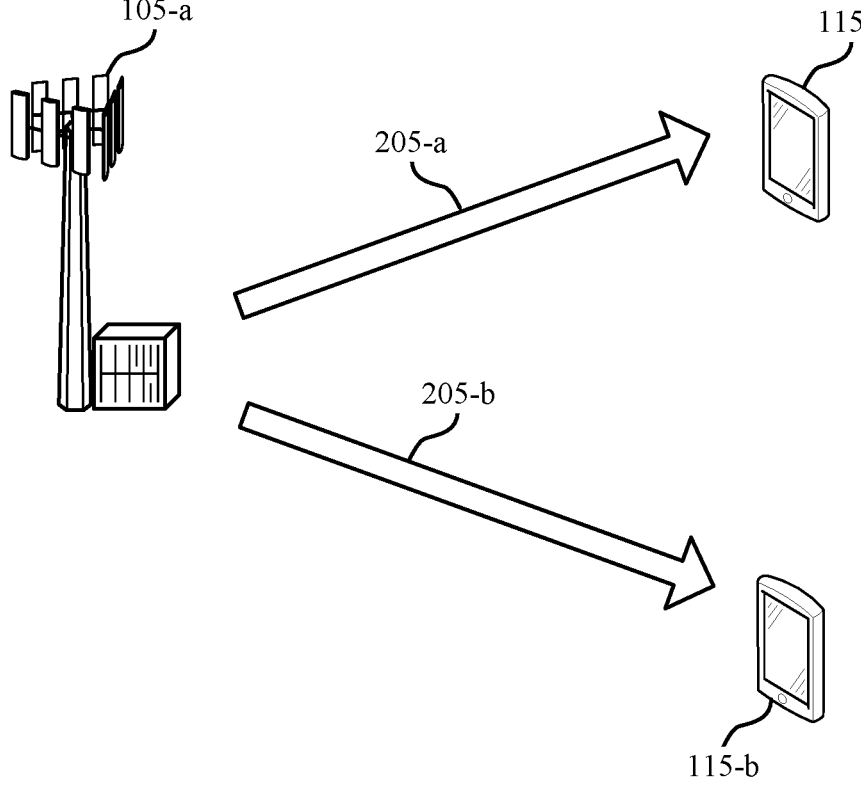

FIG. 2 illustrates an example of a wireless communications system 200 that supports enhanced secrecy for OTFS waveforms at the physical layer in accordance with one or more aspects of the present disclosure. In some examples, wireless communications system 200 may implement aspects of wireless communications system 100 and may include a UE 115-*a*, a UE 115-*b*, and a network entity 105-*a*, which may be examples of UEs 115 and a network entity 105 as described with reference to FIG. 1. Wireless communications system 200 may support enhanced security through the use of additive interference included with physical layer messages. For example, the described techniques may be used alone or serve as enhancement to one or more other techniques for enabling security of transmissions in the wireless communications system 200.

Although described as communications between UEs 115 and the network entity 105-*a*, any type or quantity of devices may implement the techniques described herein. Further, the techniques described herein may be implemented by any type or quantity of devices of any wireless communications system.

The network entity 105-*a* may communicate with the UE 115-*a* that is positioned within a coverage area of the network entity 105-*a*. The network entity 105-*a* may be an example of a transmitting device and may transmit downlink messages to the UE 115-*a* via a downlink channel 205-*a*. For example, the network entity 105-*a* may transmit, to the UE 115-*a*, control signaling (e.g., RRC signaling, DCI, MAC-CE), data signaling, reference signals (e.g., demodulation reference signals (DMRSs), channel state information reference signals (CSI-RSs)), or the like, among other examples.

In some cases, such as in high-Doppler spread or high-mobility scenarios, the network entity 105-*a* may transmit messages to the UE 115-*a* using an OTFS waveform. OTFS waveforms may be based on channel estimation performed in a delay-Doppler domain, which may enable improved accuracy and reliability (e.g., compared to channel estimation performed in a time-frequency domain), especially when a channel is rapidly varying over time (e.g., when a receiver is moving at relatively high speeds, such as when located on a high-speed train, among other examples). For example, the network entity 105-*a*, the UE 115-*a*, or both, may generate a channel estimate based on one or more reference signals (such as pilot signals) in the delay-Doppler domain. A signal in the delay-Doppler domain may occupy an entire time duration and bandwidth that is allocated for the signal, which may provide the network entity 105-*a* and the UE 115-*a* with more resources over which to estimate the channel (even in high-Doppler spread scenarios). Further, the delay-Doppler channel may be sparse and may occupy a relatively small portion or fraction of a delay-Doppler resource grid, which may support or be associated with delay or Doppler spreads that are relatively smaller (including some which may be much smaller) than a symbol duration and a subcarrier spacing (e.g., of a time-frequency domain), respectively. As such, the network entity 105-*a* and the UE 115-*a* may more accurately measure the delay and Doppler spreads of the channel, which may support a relatively more accurate estimation of the channel.

Additionally, in accordance with using a delay-Doppler channel, the network entity 105-*a* and the UE 115-*a* may more accurately measure or compute inter-carrier interference (ICI) that occurs in data channels (such as downlink channel 205-*a*), which may enable successful data detection. As part of a more accurate estimation of the channel and more successful data detection, the network entity 105-*a* and the UE 115-*a* may have a greater reliability in successfully receiving and decoding information symbols carried by the signal, which may support greater spectral efficiency, higher data rates, and increased system capacity, among other benefits, across various and diverse deployment scenarios (including scenarios associated with high-Doppler spreads).

In some examples, an OTFS waveform may be achieved by preprocessing an underlying OFDM signal. For example, the network entity 105-*a* may prepare a downlink slot for a downlink transmission and may encode (i.e., precode) the downlink transmission according to an OTFS precoding scheme, as described in more detail with reference to FIGS. 3 and 4. A delay-Doppler domain channel may be related to a time-frequency channel through ISFFT. Accordingly, the network entity 105-*a* may place a quantity of consecutive symbols of the downlink transmission in the delay-Doppler domain and may apply an ISFFT, which may place the symbols in an OFDM domain. The network entity 105-*a* may additionally append (e.g., pre-append) a cyclic prefix to the downlink transmission in the slot, and may transmit the downlink transmission in the time-frequency domain to the UE 115-*a* via the downlink channel 205-*a*.

Upon reception, the UE 115-*a* may decode the downlink transmission in accordance with the OTFS precoding scheme. That is, the UE 115-*a* may receive the downlink transmission in the time-frequency domain and may decode the downlink transmission via a symplectic Fast Fourier transform (SFFT) to convert the symbols back to the delay-Doppler domain.

In the example of FIG. 2, the UE 115-*a* may be an example of an intended receiving device, which may be authorized to receive secure (e.g., secret or confidential) transmissions from the network entity 105-*a*. In contrast, the UE 115-*b* may be an example of an unauthorized receiving device (also referred to as a malicious device or an eavesdropper) that may attempt to intercept (e.g., capture or steal) transmissions communicated between the network entity 105-*a* and the UE 115-*a*. Such attempts may also be referred to as eavesdropping attacks. In some examples, a potentially malicious device may be any wireless device within proximity of an intended receiving device. For example, the network entity 105-*a* may transmit a data transmission (e.g., including confidential information) to the UE 115-*a*. If the data transmission is not secured (e.g., using cryptography, physical-layer security, or other security techniques) a malicious device (e.g., the UE 115-*b*) may also receive the data transmission and may decode the data transmission to obtain the confidential information.

Security of wireless communications may improve reliability and confidentiality (e.g., secrecy) of exchanged data. By securing a transmission, a device may protect confidential information included in the transmission, such as information related to commercial applications (e.g., financial, medical, or pharmaceutical information), government organizations, military applications, personal data, and social networks, among other confidential and private information. In any case, unprotected wireless communications may be susceptible attacks by malicious or otherwise unauthorized devices. In addition to eavesdropping attacks, malicious devices may challenge (e.g., hijack or hack) the unprotected transmissions. For example, a malicious device may fabricate a transmission having a same format as the original (e.g., true) physical downlink control channel (PDCCH), physical downlink shared channel (PDSCH), physical uplink control channel (PUCCH), or physical uplink shared channel (PUSCH) transmission. Absent security on the transmissions, a UE 115 (e.g., the UE 115-*a*) or other intended receiving device may not distinguish between a true transmission and a fabricated transmission, which may reduce reliability and pose security threats.

In some wireless communications systems, security may be performed using cryptography. For example, cryptographic algorithms may be used to provide security via higher layers (e.g., application layers or the like). Such cryptographic algorithms are relatively difficult and time consuming to hack, which may hinder malicious devices (e.g., the UE 115-*b*) from accessing confidential information within a cryptographically-secured transmission.

However, some wireless communications may not be protected by cryptography. For example, some scheduled downlink transmissions may not be protected by cryptography to reduce overhead and latency. Further, some cryptographic approaches, such as secret key sharing, rely on confidential communication channels, which may be inapplicable in some scenarios. Additionally, or alternatively, some intended receiving devices may not be capable of encrypting or decrypting according to complex cryptographic algorithms. In such scenarios, a wireless communications system, such as the wireless communications system 200, may support physical-layer security. Here, secrecy may be achieved by exploiting the physical layer properties of the wireless communications system (e.g., noise, interference, time-varying channel properties, and the like) and their inherent randomness. For example, a transmitting device (e.g., the network entity 105-*a*) may implement physical-layer security techniques to enhance secrecy for a signal based on a channel over which the signal is transmitted. That is, the signal may be protected based on information—such as channel property information—that an authorized (e.g., intended) receiving device has, but an unauthorized (e.g., malicious) device may not have.

As a specific example, the network entity 105-*a* may design (e.g., construct) artificial noise (e.g., interference, which may be referred to as additive interference) to a signal based on an estimation of the downlink channel 205-*a*. The network entity 105-*a* may place the artificial noise (e.g., a matrix representation of the artificial noise) in a null space of a matrix representation of the downlink channel 205-*a* and may transmit the signal to the UE 115-*a* via the downlink channel 205-*a*. Because the artificial noise is located within the null space and is based on the downlink channel 205-*a*, the signal received by the UE 115-*a* may be unaffected by the artificial noise. However, a malicious device, such as the UE 115-*b*, may be in a different location than the UE 115-*a* and may experience a different channel between itself and the network entity 105-*a*, such as a downlink channel 205-*b*. Put another way, the downlink channel 205-*a* may be different than the downlink channel 205-*b*, such that the UE 115-*b* may not have—and may be unable to access—information about the downlink channel 205-*a*. Without knowledge of the downlink channel 205-*a*, the UE 115-*b* may be unable to remove the artificial noise. The artificial noise may thus act as significant destructive interference and may protect the signal by preventing the UE 115-*b* from successfully receiving or decoding the signal.

In some examples, physical-layer security techniques may improve or otherwise enhance security for communications without relying on a difficulty of computational complexity to secure the communications (e.g., cryptographic techniques). In other examples, physical-layer security techniques may be implemented in combination with higher-layer security techniques, such as cryptography.

However, relying on channel-based security methods may be difficult to implement in some scenarios. For example, when a channel varies rapidly over time (e.g., in high-Doppler spread or high-mobility scenarios), channel-based security techniques may only be effective for a time duration in which the channel (e.g., characteristics of the channel) is constant; this time duration may also be referred to as a coherence time. To maintain secrecy for a channel having a relatively short coherence time, adding artificial noise or interference based on channel estimation may introduce significant overhead and latency. The network entity 105-*a* may rely on receiving a reference signal (e.g., an SRS) from the UE 115-*a* to generate a channel estimate to use to construct added interference for a secure downlink transmission. Accordingly, when the channel varies, the network entity 105-*a* may need to receive a new reference signal and perform a new channel estimate. If the channel varies rapidly, the quantity of reference signals received and channel estimations performed may increase, which may increase communications delay and overhead. Without an accurate channel estimation, the added interference may not provide enough obstruction to protect the downlink transmission, and the downlink transmission may be susceptible to eavesdropping by the UE 115-*b*.

Accordingly, the wireless communications system 200 may support techniques for applying physical-layer security methods to OTFS communications, which may provide a protection mechanism even in cases of high-Doppler spread or increased mobility. For example, the network entity 105-*a* may apply OTFS precoding to one or more secure messages (e.g., containing confidential or secret information) that are to be transmitted to the UE 115-*a*. The secure messages may include control signaling, data signaling, reference signals (e.g., one or more DMRSs), or a combination thereof, among other examples. The network entity 105-*a* may generate a channel estimate for the downlink channel 205-*a*, such as a delay-Doppler domain channel estimate, and may add interference to the OTFS-encoded secure messages based on the channel estimate. When the network entity 105-*a* transmits the OTFS-encoded secure messages to the UE 115-*a* (e.g., via the downlink channel 205-*a*), the UE 115-*b* may attempt to intercept or otherwise capture the transmission. However, because the UE 115-*b* lacks information about the downlink channel 205-*a*, the added interference may protect the OTFS-encoded secure messages. That is, the UE 115-*b* may be unable to obtain or decode the secure messages due to the added interference, while the UE 115-*a* may be able to receive the secure messages without adverse effects.

In some examples, the network entity 105-*a* may generate the channel estimate based on receiving a reference signal from the UE 115-*a*. For example, the network entity 105-*a* may transmit control signaling (e.g., RRC signaling, DCI, MAC-CE) to the UE 115-*a* to indicate that a secure message is to be transmitted to the UE 115-*a* via the downlink channel 205-*a*, for example, using an OTFS waveform. The UE 115-*a* may transmit an SRS to the network entity 105-*a* in response to (e.g., based on) the control signaling, for example, via an uplink channel. The network entity 105-*a* may generate a channel estimate for the downlink channel 205-*a* based on the SRS. That is, channel reciprocity may be present in TDD-configured communications for channels between the network entity 105-*a* and the UE 115-*a*, such that the network entity 105-*a* may assume that a channel estimate for an uplink channel (e.g., generated based on the received SRS) is about equivalent to a channel estimate for the downlink channel 205-*a*. Put another way, the network entity 105-*a* may generate the downlink channel estimate for the downlink channel 205-*a* based on the uplink channel estimate and a TDD configuration for communications between the network entity 105-*a* and the UE 115-*a*. For example, a matrix representation of the downlink channel 205-*a* (e.g., the channel estimate for the downlink channel 205-*a*) may be given by $H_{AB}$, while a matrix representation of the uplink channel (e.g., the channel estimate for the uplink channel) may be given by $H_{BA}$. Assuming channel reciprocity, $H_{AB}=H_{BA}$.

Based on the channel estimate for the downlink channel 205-*a*, the network entity 105-*a* may construct (e.g., create, compute, generate) interference to be added to the secure message. For example, the added interference may be associated with a null space of a product of a matrix representation of the channel estimate (e.g., $H_{AB}$) and a cyclic prefix removal matrix (e.g., D). In some cases, the added interference may be a product of a vector and a matrix, where the matrix spans the null space. The vector may include one or more values that are preconfigured or are randomly generated. In any case, the network entity 105-*a* may encode the secure message using an OTFS precoder, and may add the interference to a slot (e.g., over a slot duration) in which the secure message is to be transmitted. The network entity 105-*a* may transmit the encoded secure message including the added interference to the UE 115-*a* via the downlink channel 205-*a*.

By associating (e.g., placing) the interference in the null space, the interference may not affect reception of the secure message at the UE 115-*a*; when the UE 115-*a* applies the cyclic prefix removal matrix to the received secure message, the interference may be canceled out, and the UE 115-*a* may decode the secure message (e.g., based on the OTFS precoding scheme) without the interference. Additionally, because a matrix representation of a channel estimate for the downlink channel 205-*b* (which may be given by $H_{AC}$) may differ from the matrix representation of the channel estimate for the downlink channel 205-*a* (e.g., $H_{AB} \neq H_{AC}$), the UE 115-*b* may be unable to remove or otherwise cancel the interference and may be unable to obtain the secure message.

In some cases, the network entity 105-*a*, the UE 115-*a*, or both, may calibrate the OTFS precoding scheme by determining and/or adjusting one or more calibration coefficients. For example, the network entity 105-*a* may transmit one or more CSI-RSs to the UE 115-*a*. In some cases, the network entity 105-*a* may transmit the one or more CSI-RSs as part of the secure message. The UE 115-*a* may receive the one or more CSI-RSs and may generate a downlink channel estimate for the downlink channel 205-*a* based on the one or more CSI-RSs (e.g., based on performing measurements associated with the one or more CSI-RSs). The UE 115-*a* may transmit, to the network entity 105-*a*, a feedback message indicating the downlink channel estimate.

The network entity 105-*a* may determine the one or more calibration coefficients based on the channel estimate generated by the network entity 105-*a* (e.g., based on the SRS) and the feedback message, and may encode the secure message using the OTFS precoding scheme based on the one or more calibration coefficients. Additionally, or alternatively, the UE 115-*a* may determine the one or more calibration coefficients, e.g., based on generating the downlink channel estimate. In such examples, the UE 115-*a* may use the one or more calibration coefficients to decode an OTFS-encoded secure message.

Calibration coefficients may include, but are not limited to, a ratio of gain values associated with communication channels between the network entity 105-*a* and the UE 115-*a*. For example, a matrix representation of a channel H may be adjusted by channel gains at a transmitting device and a receiving device. In the example of FIG. 2, a transmission channel gain at the network entity 105-*a* may be given by $G_{A,TX}$, and a reception channel gain at the UE 115-*a* may be given by $G_{B,RX}$. As such, the downlink channel 205-*a* may be represented by Equation 1.

$$H_{AB}=G_{A,TX}HG_{B,RX} \tag{1}$$

Similarly, the uplink channel between the network entity 105-*a* and the UE 115-*a* may be given by Equation 2.

$$H_{BA}=G_{B,TX}HG_{A,RX} \tag{2}$$

In Equation 2, a transmission channel gain at the UE 115-*a* may be given by $G_{B,TX}$) and a reception channel gain at the network entity 105-*a* may be given by $G_{A,RX}$. The network entity 105-*a* may therefore account for inaccuracies in the channel reciprocity assumption (e.g., $H_{AB}=H_{BA}$), such as mismatches between the uplink channel and the downlink channel 205-*a*, by adjusting a ratio of gain values from Equations 1 and 2. For instance, a first gain value, $G_1$, may be equal to a product of $G_{A,TX}$ and $G_{B,RX}$. A second channel gain value, $G_2$, may be equal to a product of $G_{B,TX}$ and $G_{A,RX}$ Calibrating or adjusting the ratio of the first gain value to the second gain value $$\left( e.g., \frac{G_1}{G_2} \right)$$

may enable the network entity 105-*a* or the UE 115-*a* to compensate for misalignment between the downlink channel 205-*a* and the uplink channel.

Figure 3:
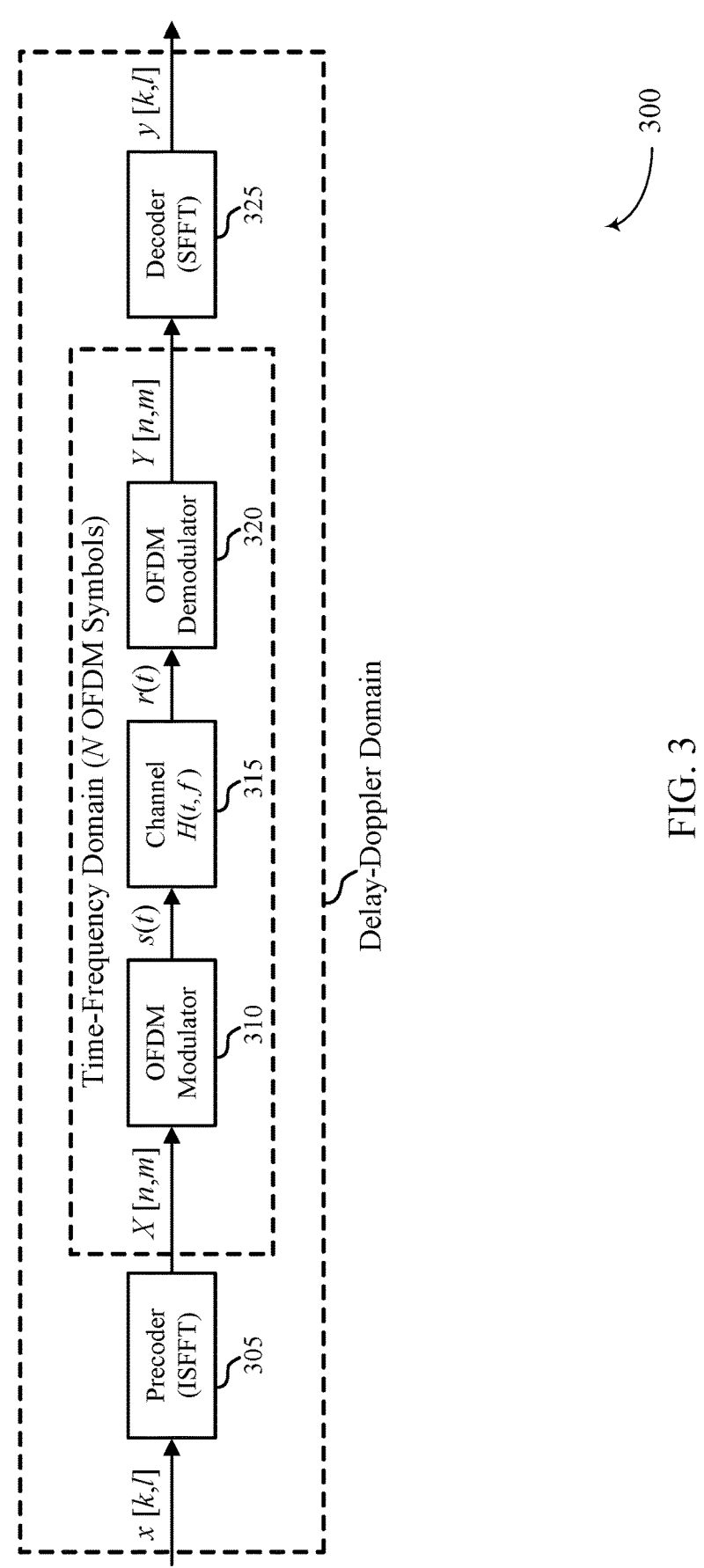
FIG. 3 illustrates an example of a coding scheme that supports enhanced secrecy for OTFS waveforms at the physical layer in accordance with one or more aspects of the present disclosure.

FIG. 3 illustrates an example of a coding scheme 300 that supports enhanced secrecy for OTFS waveforms at the physical layer in accordance with one or more aspects of the present disclosure. The coding scheme 300 may be implemented to realize aspects of the wireless communications system 100, the wireless communications system 200, the processing diagram 400, or the signaling diagram 500. For example, a network entity and a UE (e.g., a network entity 105-*a* and a UE 115-*a*, respectively, as described with reference to FIG. 2) may perform one or more operations or processing tasks associated with the coding scheme 300 to transmit or receive secure messages (e.g., including added interference) via an OTFS-precoded waveform and in accordance with the physical-layer security techniques described herein.

In some aspects, OTFS modulation or precoding may be seen or understood as an ISFFT precoder 305 applied or performed on N consecutive OFDM symbols. For example, network entity may include one or more components associated with the ISFFT precoder 305 and may perform or apply an ISFFT to a set of symbols x[k, l] (which may be examples of modulated symbols, such as quadrature phase shift keying (QPSK) symbols). For example, the set of symbols x[k, l] may carry confidential information to be transmitted by the network entity as part of a secure message. An ISFFT may be an example of a 2D FFT, where N is a quantity of OFDM symbols and M is a quantity of subcarriers. As part of the coding scheme 300, symbols (e.g., of a secure message to be transmitted) may be placed in the delay-Doppler domain instead of in the time-frequency domain (as may be performed for OFDM) and the network entity may transform the symbols from the delay-Doppler domain to the time-frequency domain via an ISFFT. Further, an ISFFT may be associated with an inverse fast Fourier transform (IFFT) in the Doppler domain and a fast Fourier transform (FFT) in the delay domain, as illustrated by and described in more detail with reference to FIG. 4.

The network entity may obtain, as an output of the ISFFT precoder 305, a set of symbols X[n, m], which may be defined in accordance with Equation 3.

$$X[n, m] = \frac{1}{\sqrt{NM}} \sum_{k=0}^{N-1} \sum_{l=0}^{M-1} x[k, l] e^{j2\pi\left(\frac{nk}{N} - \frac{ml}{M}\right)} \tag{3}$$

The network entity may perform or apply an OFDM modulator 310 on the set of symbols X[n, m] to obtain a time-domain signal s(t). As described in more detail with reference to FIG. 5, the network entity may generate and add interference over a slot duration of the time-domain signal s(t), e.g., after the symbols of the secure message have been output from the ISFFT precoder 305 and the OFDM modulator 310, and may append or pre-append a cyclic prefix. The network entity may transmit the time-domain signal s(t) including the added interference and the cyclic prefix over-the-air to the UE. The over-the-air signaling between the network entity and the UE may be associated with a time-frequency channel 315, which may be understood as H(t, f). The time-frequency channel 315 may be related to the delay-Doppler channel. For example, in some implementations, a relationship between the delay-Doppler channel h(τ, v) and the time-frequency channel 315 H(t, f) may be defined in accordance with Equations 4 and 5.

$$h(\tau,v)=\iint H(t,f)e^{-j2\pi(vt-f\tau)}dt \, df \tag{4}$$

$$H(\tau,f)=\iint h(\tau,v)e^{-j2\pi(vt-f\tau)}d\tau df \tag{5}$$

In a discrete domain (such as in a domain associated with a quantity of discrete points or values), the relationship between the delay-Doppler channel h(τ, v)=h(l, k) and the time-frequency channel 315 H(t, f)=H(n, m) may be defined in accordance with Equations 6 and 7.

$$h[l, k] = \sum_{k=0}^{N-1} \sum_{l=0}^{M-1} H[n, m] e^{-j2\pi nk} e^{j2\pi ml} \tag{6}$$

$$H[n, m] = \sum_{k} \sum_{l} h[l, k] e^{j2\pi nk} e^{-j2\pi ml} \tag{7}$$

In some aspects, and due to an under-spread nature of the channel, h[l, k] may be non-zero for $$k < \frac{v_{max}}{\Delta f}, l < \frac{\tau_{max}}{T},$$

where Δf is a subcarrier spacing, T is an OFDM symbol duration, M is a quantity of subcarriers, N is a quantity of OFDM symbols, and $\tau_{max}$ and $v_{max}$ are a maximum delay spread and a maximum Doppler spread of the channel, respectively.

The UE may receive a time-domain signal r(t) (such that r(t)=H(t,f)s(t)) that includes the added interference. As described in more detail with reference to FIG. 5, the UE may remove the cyclic prefix from the time-domain signal r(t) and, in doing so, may also remove the added interference. As such, the added interference may have minimal effect on the UE when decoding the signal. Moreover, the added interference may simultaneously cause one or more other receivers (e.g., unauthorized receivers, eavesdroppers) to encounter difficulty (e.g., relatively increased decoding complexity) when attempting to decode the message. The UE may perform or apply an OFDM demodulator 320 on the time domain signal r(t) to obtain a set of symbols Y[n, m] in the time-frequency domain. The UE may perform or apply, via one or more components associated with an SFFT precoder 325, an SFFT on the set of symbols Y[n, m] in the time-frequency domain to obtain a set of symbols y[k, l] in the delay-Doppler domain. The UE may perform or apply a circular correlation or convolution to obtain the delay-Doppler channel and an OTFS input-output relation in scenarios of delay-Doppler channel may be associated with a circular convolution (such as a 2D circular convolution) with varying phase shifts and defined in accordance with Equation 8.

$$y[k, l] = \sum_{i=0}^{P} h_i e^{j2\pi\left(\frac{l-l_{\tau_i}}{M}\right)\frac{k v_i}{N}} \alpha_i(k, l) \times \left[[k - k_{v_i}]_N, [l - l_{\tau_i}]_M\right] \tag{8}$$

In some aspects, and due in part to the under-spread nature, the channel may occupy a relatively small fraction or portion (such as a relatively small fraction or portion around an origin) of a delay-Doppler grid. As shown in Equation 7, P may be a quantity of delay-Doppler paths, $l_\tau$ may be a delay tap, $k_v$ may be a Doppler tap, and $\alpha_i(k, l)$ may be defined in accordance with Equation 9.

$$a_i(k, l) = \begin{cases} 1_{\tau_i} \leq l \leq M \\ e^{-j2\pi\left(\frac{[k-kv_i]_N}{N}\right)}_{0 \leq l \leq l_{\tau_i}} \end{cases} \quad (9)$$

In some implementations, a relation between a secure message transmitted by the network entity and received by the UE in the delay-Doppler domain may be approximated in accordance with Equation 10.

$$\tilde{y}[l', k'] \approx \sum_k \sum_l h[l, k]\, \tilde{x}\big[\mathrm{mod}(l' - l, \widetilde{M}),\, \mathrm{mod}(k' - k, \tilde{N})\big] \quad (10)$$

As shown in Equation 9, $\tilde{x}[l', k']$ and $\tilde{y}[l', k']$ may be the transmitted and received sequences corresponding to the secure message, respectively, in the delay-Doppler domain and $h[l, k]$ may be the delay-Doppler channel. In some implementations, the UE may estimate or measure a value of the delay-Doppler channel $h[l, k]$ in accordance with implementing a circular correlator (such as a 2D circular correlator). In some aspects, the UE may selectively perform or apply the circular correlator in accordance with one or more properties or characteristics of the transmitted or received secure message. For example, the UE may perform or apply the circular correlator if the sequence $\tilde{x}[l', k']$ has suitable correlation properties (such as a correlation value that satisfies a threshold correlation value) or may refrain from performing or applying the circular correlator if the sequence $\tilde{x}[l', k']$ has unsuitable correlation properties (such as a correlation value that fails to satisfy a threshold correlation value).

In implementations in which the UE estimates a value of $h[l, k]$, the UE may calculate, compute, or otherwise determine ICI in OFDM as the off-diagonal elements of $F\tilde{H}F^H$, where $\tilde{H}$ may be defined in accordance with Equation 11 and where F may be an FFT matrix. In accordance with Equation 11, for a zero Doppler scenario, $\tilde{H}$ may become a circular matrix with a first column as a channel impulse response.

$$\tilde{H}[p, q] = \sum_k \sum_l h[l, k]\delta(\mathrm{mod}(p - q - l, M))e^{j2\pi qk} \quad (11)$$

As such, the UE may measure or estimate a value of the delay-Doppler channel $h[l, k]$ and may use the measured or estimated channel $h[l, k]$ to measure or estimate an ICI associated with the channel. Further, and as a result of implementing the examples disclosed herein, the UE may be able to more accurately measure or estimate the ICI associated with the channel in scenarios in which the UE is in a high-mobility state (such as moving relatively quickly) or otherwise in a high-Doppler scenario.

Figure 4:
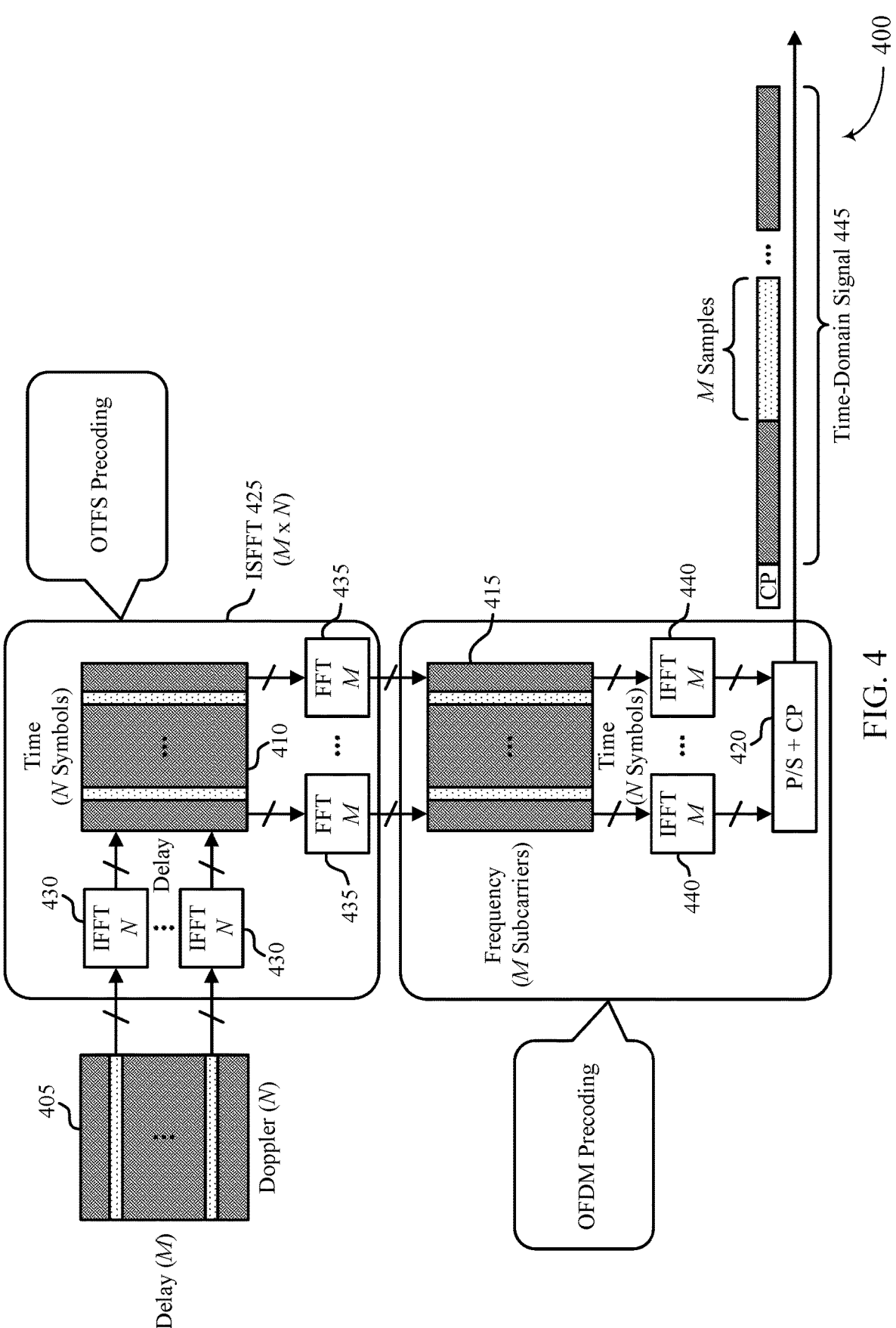
FIG. 4 illustrates an example of a processing diagram that supports enhanced secrecy for OTFS waveforms at the physical layer in accordance with one or more aspects of the present disclosure.

FIG. 4 illustrates an example of a processing diagram 400 that supports enhanced secrecy for OTFS waveforms at the physical layer in accordance with one or more aspects of the present disclosure. The processing diagram 400 may be implemented to realize aspects of the wireless communications system 100, the wireless communications system 200, the coding scheme 300, or the signaling diagram 500. For example, a network entity and a UE (e.g., a network entity 105-a and a UE 115-a, respectively, as described with reference to FIG. 2), may perform one or more operations of the processing diagram 400 to support an OTFS transmitter implementation according to which the network entity may convert delay-Doppler domain symbols (e.g., of a secure message) to a time-frequency-domain using an ISFFT 425 and generate a time-domain signal 445 using an IFFT 440.

For example, the network entity may allocate or place information symbols to be transmitted as part of a secure message in a delay-Doppler domain associated with, in the example of FIG. 4, a delay-domain size of M and a Doppler-domain size of N. Accordingly, a set of delay-Doppler domain resources 405 may have dimensions of M×N. For some modulation techniques, such as a quadrature-amplitude modulation (QAM) or a quotient QAM (Q-QAM), the delay-Doppler domain resources 405 may convey MN*$\log_2$ (Q) bits.

To generate an OTFS waveform (such as an OTFS precoded waveform), the network entity may perform or apply an ISFFT 425 of size M×N to convert the delay-Doppler domain resources 405 to a set of time-frequency domain resources 415. To perform the ISFFT 425, which may be associated with or equivalently referred to as an OTFS precoding, the network entity may perform or apply an IFFT 430 of size N on the delay-Doppler domain resources 405 to obtain a set of delay-time domain resources 410 and may perform or apply an FFT 435 of size M on the delay-time domain resources 410 to obtain the time-frequency domain resources 415.

The network entity may perform or apply an IFFT 440 of size M on the set of time-frequency domain resources 415 to obtain a phase shift (P/S) and cyclic prefix (CP) 420 associated with the time-domain signal 445. In some aspects, the performance of the IFFT 440 on the set of time-frequency domain resources 415 may involve one or more processing steps that are associated with (e.g., identical to) processing associated with an OFDM waveform or OFDM precoding. The network entity may output the P/S and CP 420 to the time-domain signal 445. In some aspects, the time-domain signal 445 may include a quantity of N symbols and each of the N symbols may include or convey M samples.

Accordingly, in some implementations, the network entity may perform operations (such as operations associated with both the OTFS precoding and the OFDM precoding) of the processing diagram 400 to generate and output an OTFS-precoded time-domain signal 445, which may be an example of a secure transmission (e.g., carrying confidential or private information). The network entity may generate and add interference to the time-domain signal 445 (e.g., over a slot of the time-domain signal 445) based on a channel estimate for a channel between the network entity and the UE, which may enhance security and secrecy of the time-domain signal 445 as it is transmitted over the channel to the UE. The UE may receive the time-domain signal 445 and, in some implementations, may perform one or more operations associated with reversing the processing diagram 400 to demodulate and decode the time-domain signal 445. In such cases, the added interference (e.g., over the slot) may not affect the UE (or have minimal effect on the UE) when decoding the signal, whereas the added interference may simultaneously cause one or more other receivers (e.g., unauthorized receivers, eavesdroppers) to encounter difficulty when attempting to decode the message.

Figure 5:
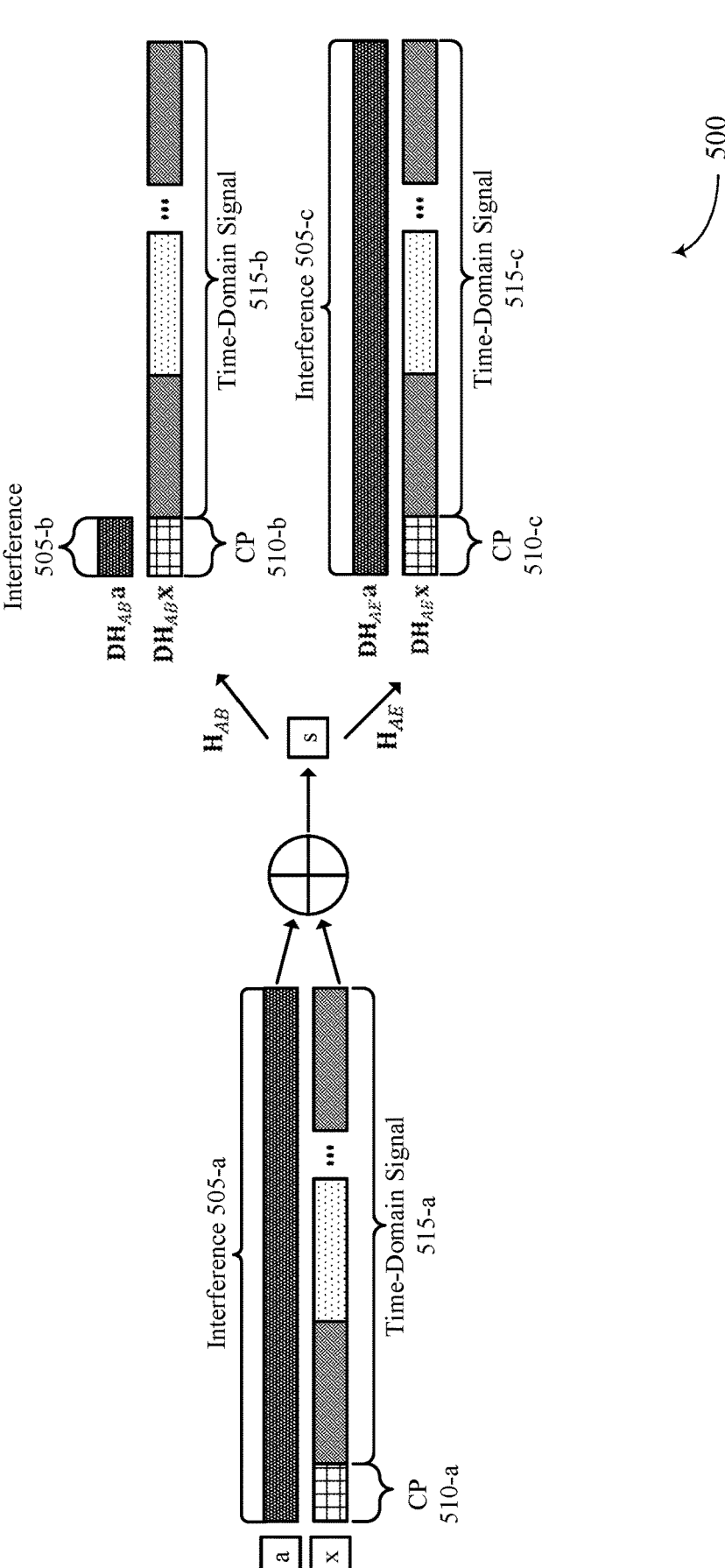
FIG. 5 illustrates an example of a signaling diagram that supports enhanced secrecy for OTFS waveforms at the physical layer in accordance with one or more aspects of the present disclosure.

FIG. 5 illustrates an example of a signaling diagram 500 that supports enhanced secrecy for OTFS waveforms at the physical layer in accordance with one or more aspects of the present disclosure. The signaling diagram 500 may be implemented to realize aspects of the wireless communications system 100, the wireless communications system 200, the coding scheme 300, or the processing diagram 400. For example, the signaling diagram 500 may implemented by a network entity and a UE (e.g., a network entity 105-*a* and a UE 115-*a*, respectively, as described with reference to FIG. 2), to transmit and receive secure messages (e.g., including added interference) via an OTFS-precoded waveform.

A channel over which a signal is transmitted may be defined by a matrix representation H. For example, the network entity may estimate (e.g., based on receiving an SRS from the UE) an uplink channel between the network entity and the UE, and may determine a matrix representation of the uplink channel estimate $H_{BA}$. Due to channel reciprocity, a matrix representation of a corresponding downlink channel (e.g., a channel estimate for the downlink channel) may be given by $H_{AB}$. As described with reference to FIG. 2, a channel between the network entity and a malicious device (e.g., an eavesdropping UE, such as the UE 115-*b* described with reference to FIG. 2) may be given by $H_{AC}$, such that $H_{AB} \neq H_{AC}$. The network entity may rely on this distinction to design added (i.e., artificial) interference for a secure downlink message to the UE in accordance with the techniques discussed herein.

For example, as described with reference to FIGS. 3 and 4, the network entity may apply or perform an OTFS precoding scheme on a set of symbols of a secure downlink message to be transmitted to the UE. The secure downlink message may include or be an example of a slot-based OTFS waveform, where each slot contains N symbols, and each symbol contains M samples; additionally, each slot may include a cyclic prefix. After OTFS precoding, the secure downlink message may be understood as a time-domain OTFS signal having a matrix representation x, defined by Equation 12.

$$x = A\left(F_N^H \otimes I_M\right)d \qquad (12)$$

In Equation 12, x may be a complex valued vector of length $MN+L_c$ that denotes an OTFS slot that includes N symbols of M samples, as well as a quantity $L_c$ of cyclic prefix samples.

$$F_N^H$$

may be the matrix representation of the IFFT as described with reference to FIG. 3 and may have a size N×N.

$$F_N^H \otimes I_M$$

represents the mapping of delay-Doppler domain resources of the secure downlink message to the time domain, and d may be a vector of length MN of information elements of the secure downlink message in the delay-Doppler domain. The network entity may pre-append the cyclic prefix to the slot via the matrix A, given by Equation 13.

$$A = \begin{bmatrix} 0_{L_C} \times MN - L_C & I_{L_C} \\ I_{MN} \end{bmatrix} \qquad (13)$$

As illustrated in FIG. 5, the network entity may transmit, over a channel (e.g., a downlink channel, such as a PDSCH, a PDCCH, or the like, among other examples), a time-domain signal 515-*a* including a cyclic prefix 510-*a* in accordance with Equations 12 and 13. Additionally, as described herein, the network entity may add interference 505-*a* to a slot (e.g., on a per-slot basis) of the time-domain signal 515-*a*, e.g., based on an estimate of the channel. The interference 505-*a* may be represented by a vector a. The transmitted signal s including the time-domain signal 515-*a*, the cyclic prefix 510-*a*, and the interference 505-*a* may be defined by Equation 14.

$$s = x + a \qquad (14)$$

The UE may receive a time-domain signal 515-*b*, cyclic prefix 510-*b*, and interference 505-*b*, and may apply a cyclic prefix removal matrix D, defined by Equation 15.

$$D = [0_{MN \times L_c} I_{MN}] \qquad (15)$$

The time-domain signal 515-*b* received at the UE, after application of the cyclic prefix removal matrix D, may therefore be represented by $DH_{AB}x$, and the interference 505-*b* received at the intended UE may be represented by $DH_{AB}a$. The combined received time-domain signal 515-*b* and interference 505-*b* may be represented by a vector y having a length MN and defined by Equation 16. In Equation 16, $H_{AB}$ may be a matrix representation of the channel with dimensions $(MN+L_c) \times (MN+L_c)$, and n may be a complex additive white Gaussian noise (AWGN) vector.

$$y = DH_{AB}x + DH_{AB}a + n \qquad (16)$$

The network entity, based on generating the channel estimate, may design and generate the interference 505-*a* such that the vector a in Equation 16 is associated with (e.g., belongs to or is located in) a null space of a matrix $DH_{AB}$ (e.g., a product of the cyclic prefix removal matrix D and the channel matrix $H_{AB}$). More specifically, because the matrix $H_{AB}$ is of size $(MN+L_c) \times (MN+L_c)$, the matrix $DH_{AB}$ may have dimensions $(MN) \times (MN+L_c)$, such that the null space of the matrix $DH_{AB}$ may be at least $L_c$. The null space may be represented by Equation 17.

$$DH_{AB}a = 0 \qquad (17)$$

Put another way, by creating (e.g., generating, computing) a to satisfy Equation 17, application of the cyclic prefix removal matrix D by the UE may effectively cancel out the interference 505-*b*. The UE may therefore remove the cyclic prefix 510-*b* from the time-domain signal 515-*b* and may process and decode the time-domain signal 515-*b* without experiencing interference 505-*b* in a destructive manner.

For example, the network entity may design a to be a product of a vector u and a matrix P in accordance with Equation 18.

$$a = Pu \qquad (18)$$

In some examples, the matrix P may span the null space of $DH_{AB}$, and may have dimensions $(MN+L_c) \times (L_c)$. In some cases, the matrix P may include eigenvectors of the null space. The vector u may be a vector of length $L_c$. In some examples, the network entity may generate the vector u to include one or more values that are randomly-generated. In other examples, the network entity may generate the vector u to include one or more preconfigured values. For instance, the one or more preconfigured values may be selected to reduce out-of-band emissions of the OTFS waveform, to reduce peak-to-average power ratios (PAPR) of the OTFS waveform, or the like, among other examples.

While the UE may be able to receive the time-domain signal 515-*b* without adverse effects from the interference 505-*b*, the interference 505-*a* transmitted as part of the time-domain signal 515-*a* may provide protection from eavesdropping malicious devices. For example, a malicious device (e.g., the eavesdropping UE) may intercept the transmitted signal s including the time-domain signal 515-*a*, the cyclic prefix 510-*a*, and the interference 505-*a* (e.g., as given by Equation 14).

As described with reference to FIG. 2, a channel between the eavesdropping UE and the network entity may be represented by a matrix $H_{AC}$, where $H_{AB} \neq H_{AC}$. The intercepted signal may be received at the eavesdropping UE as interference 505-*c*, a cyclic prefix 510-*c*, and a time-domain signal 515-*c*, and may be represented by Equation 19.

$$y = DH_{AC}x + DH_{AC}a + n \qquad (19)$$

In Equation 19, the added interference vector a fails to satisfy Equation 17. That is, because the eavesdropping UE experiences a different channel than the intended UE (e.g., because $H_{AB} \neq H_{AC}$), $DH_{AC}a \neq 0$, and application of a cyclic prefix removal matrix D will fail to remove (e.g., cancel out) the interference 505-*c*. As a result, even if the eavesdropping UE captures (e.g., steals) the time-domain signal 515-*c*, the eavesdropping UE may be unable to decode or otherwise process the time-domain signal 515-*c*. Accordingly, adding channel-based interference may provide security for and protect confidential information included within the time-domain signal 515-*c*.

Figure 6:
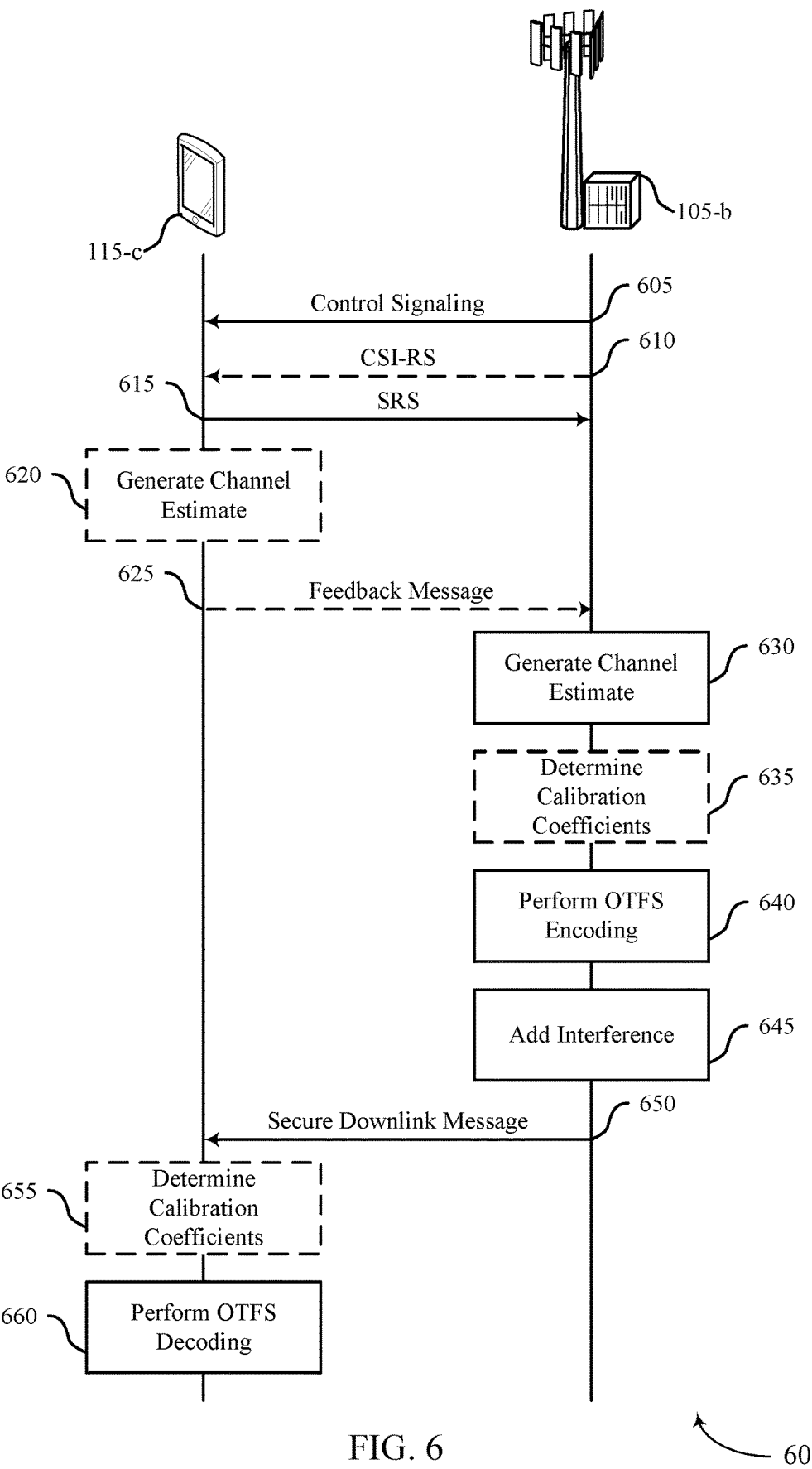
FIG. 6 illustrates an example of a process flow in a system that supports enhanced secrecy for OTFS waveforms at the physical layer in accordance with one or more aspects of the present disclosure.

FIG. 6 illustrates an example of a process flow 600 in a system that supports enhanced secrecy for OTFS waveforms at the physical layer in accordance with one or more aspects of the present disclosure. The process flow 600 may implement or be implemented to realize aspects of the wireless communications system 100, the wireless communications system 200, the coding scheme 300, the processing diagram 400, or the signaling diagram 500. For example, the process flow 600 illustrates communication between a UE 115-*c* and a network entity 105-*b*, which may be examples of UEs 115 and network entities 105 as described herein. Additionally, the UE 115-*c* may be an example of an authorized device, also referred to as an intended receiving device, and the network entity 105-*b* may be an example of a transmitting device.

In the following description of the process flow 600, the operations may be performed (e.g., reported or provided) in a different order than the order shown, or the operations performed by the example devices may be performed in different orders or at different times. Some operations also may be omitted from the process flow 600, or other operations may be added to the process flow 600. Further, although some operations or signaling may be shown to occur at different times for discussion purposes, these operations may actually occur at the same time or otherwise concurrently.

At 605, the network entity 105-*b* may transmit, and UE 115-*c* may receive, control signaling indicating that a secure downlink message is scheduled for transmission to the UE 115-*c*. The control signaling may include or be an example of RRC signaling, DCI, a MAC-CE, or the like.

At 610, the network entity 105-*b* may optionally transmit, and the UE 115-*c* may receive, one or more CSI-RSs.

At 615, based on (e.g., in response to) receiving the control signaling at 605, the UE 115-*c* may transmit, and the network entity 105-*b* may receive, one or more SRSs for generating a channel estimate for a channel between the UE 115-*c* and the network entity 105-*b*. In some examples, the channel may be a downlink channel, such as a PDSCH, PDCCH, or the like.

At 620, the UE 115-*c* may optionally generate a channel estimate for the channel. For example, if the UE 115-*c* received one or more CSI-RSs at 610, the UE 115-*c* may perform one or more channel measurements based on the CSI-RSs.

At 625 the UE 115-*c* may optionally transmit, and the network entity 105-*b* may receive, a feedback message indicating the channel estimate generated at 620. For example, the UE 115-*c* may indicate, as part of the feedback message, one or more CSI parameters, such as a channel quality indicator (CQI), a rank indicator (RI), etc.

At 630, the network entity 105-*b* may generate a channel estimate for the channel based on receiving the SRS at 615. In some examples, the network entity 105-*b* may generate the channel estimate in accordance with a delay-Doppler domain channel estimation scheme. In some cases, the network entity 105-*b* may generate an uplink channel estimate based on the SRS and may generate the channel estimate for the channel based on the uplink channel estimate and a TDD configuration for communications between the UE 115-*c* and the network entity 105-*b*. In some examples, if the UE 115-*c* transmitted the feedback message at 625, the network entity 105-*b* may generate the channel estimate based on the SRS and the feedback message.

At 635, the network entity 105-*b* may optionally determine one or more calibration coefficients, for example, based on receiving the feedback message at 625 and the channel estimate generated at 630. The one or more calibration coefficients may be associated with a ratio of a first gain value to a second gain value. The first gain value may be a product of a transmission channel gain at the network entity 105-*b* and a reception channel gain at the UE 115-*c*, and the second gain value may be a product of a transmission channel gain at the UE 115-*c* and a reception channel gain at the network entity 105-*b*.

At 640, the network entity 105-*b* may encode the secure downlink message in accordance with an OTFS precoding scheme. For example, the network entity 105-*b* may apply an OTFS precoder to symbols of the secure downlink message. In some examples, e.g., if the network entity 105-*b* determined one or more calibration coefficients at 635, the network entity 105-*b* may encode the secure downlink message based on the one or more calibration coefficients.

At 645, the network entity 105-*b* may generate and add interference to the secure downlink message, for example, over a slot duration. The added interference may be based on (e.g., generated based on) the channel estimate. In some examples, the added interference may be associated with a null space of a product of a first matrix and a second matrix. In such examples, the first matrix may be representative of the channel estimate and the second matrix may correspond to a cyclic prefix removal matrix. In some cases, the added interference may be a product of a vector and third matrix. Here, the third matrix may span the null space of the product of the first matrix and the second matrix. Additionally, or alternatively, the vector may include one or more randomly-generated values, one or more preconfigured values, or a combination thereof.

At 650, the network entity 105-*b* may transmit, and the UE 115-*c* may receive, the encoded secure downlink message including the added interference. In some examples, the network entity 105-*b* may transmit, and the UE 115-*c* may receive, one or more CSI-RSs with the encoded secure downlink message.

At 655, the UE 115-*c* may optionally determine one or more calibration coefficients. For example, the UE 115-*c* may determine the one or more calibration coefficients based on one or more CSI-RSs, e.g., received at 610 or with the encoded secure downlink message at 650. The one or more calibration coefficients may be associated with a ratio of a first gain value to a second gain value. The first gain value may be a product of a transmission channel gain at the network entity 105-*b* and a reception channel gain at the UE 115-*c*, and the second gain value may be a product of a transmission channel gain at the UE 115-*c* and a reception channel gain at the network entity 105-*b*.

At 660, the UE 115-*c* may decode the encoded secure downlink message in accordance with the OTFS precoding scheme. In some examples, e.g., if the UE 115-*c* determined one or more calibration coefficients at 655, the UE 115-*c* may decode the encoded secure downlink message based on the one or more calibration coefficients.

Figure 7:
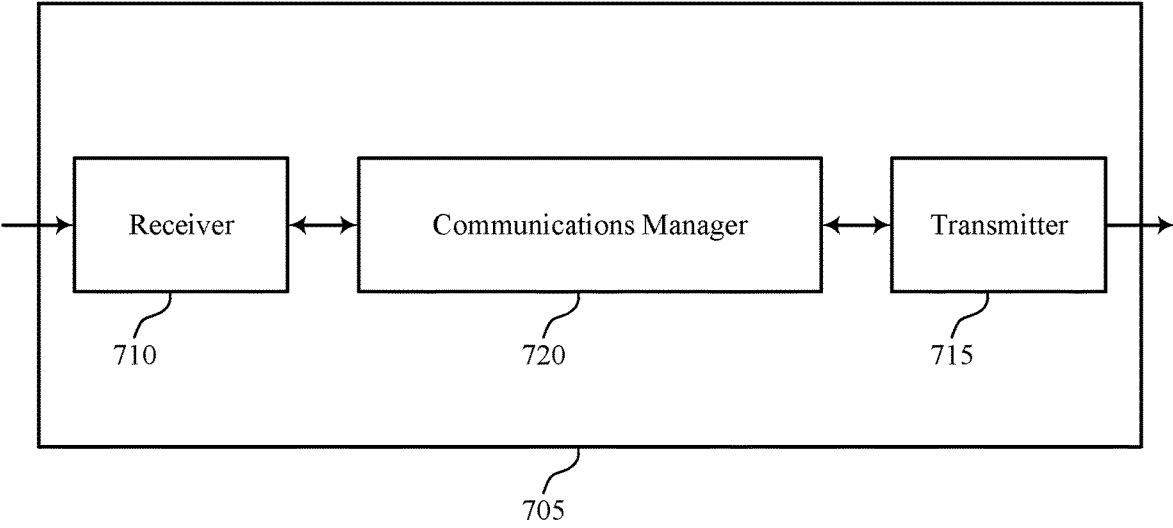
FIGS. 7 and 8 show block diagrams of devices that support enhanced secrecy for OTFS waveforms at the physical layer in accordance with one or more aspects of the present disclosure.

FIG. 7 shows a block diagram 700 of a device 705 that supports enhanced secrecy for OTFS waveforms at the physical layer in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of enhanced secrecy for OTFS waveforms at the physical layer as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a network entity in accordance with examples as disclosed herein. For example, the communications manager 720 may be configured as or otherwise support a means for transmitting control signaling indicating that a secure downlink message is scheduled for transmission to a UE. The communications manager 720 may be configured as or otherwise support a means for receiving, in response to the control signaling, an SRS for generating a channel estimate for a channel between the network entity and the UE. The communications manager 720 may be configured as or otherwise support a means for encoding the secure downlink message in accordance with an OTFS precoding scheme. The communications manager 720 may be configured as or otherwise support a means for adding interference to the encoded secure downlink message over a slot duration, the added interference being based on the channel estimate. The communications manager 720 may be configured as or otherwise support a means for transmitting, via the channel, the encoded secure downlink message that includes the added interference.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for physical-layer security for OTFS waveforms. For example, the device 705 may add channel-based interference to an OTFS-precoded transmission, which may enable enhanced secrecy in high-Doppler scenarios without increasing overhead or latency, in turn reducing processing and power consumption. Additionally, malicious receivers may be unable to intercept the secure OTFS-precoded transmission, which may improve security and communication reliability.

Figure 8:
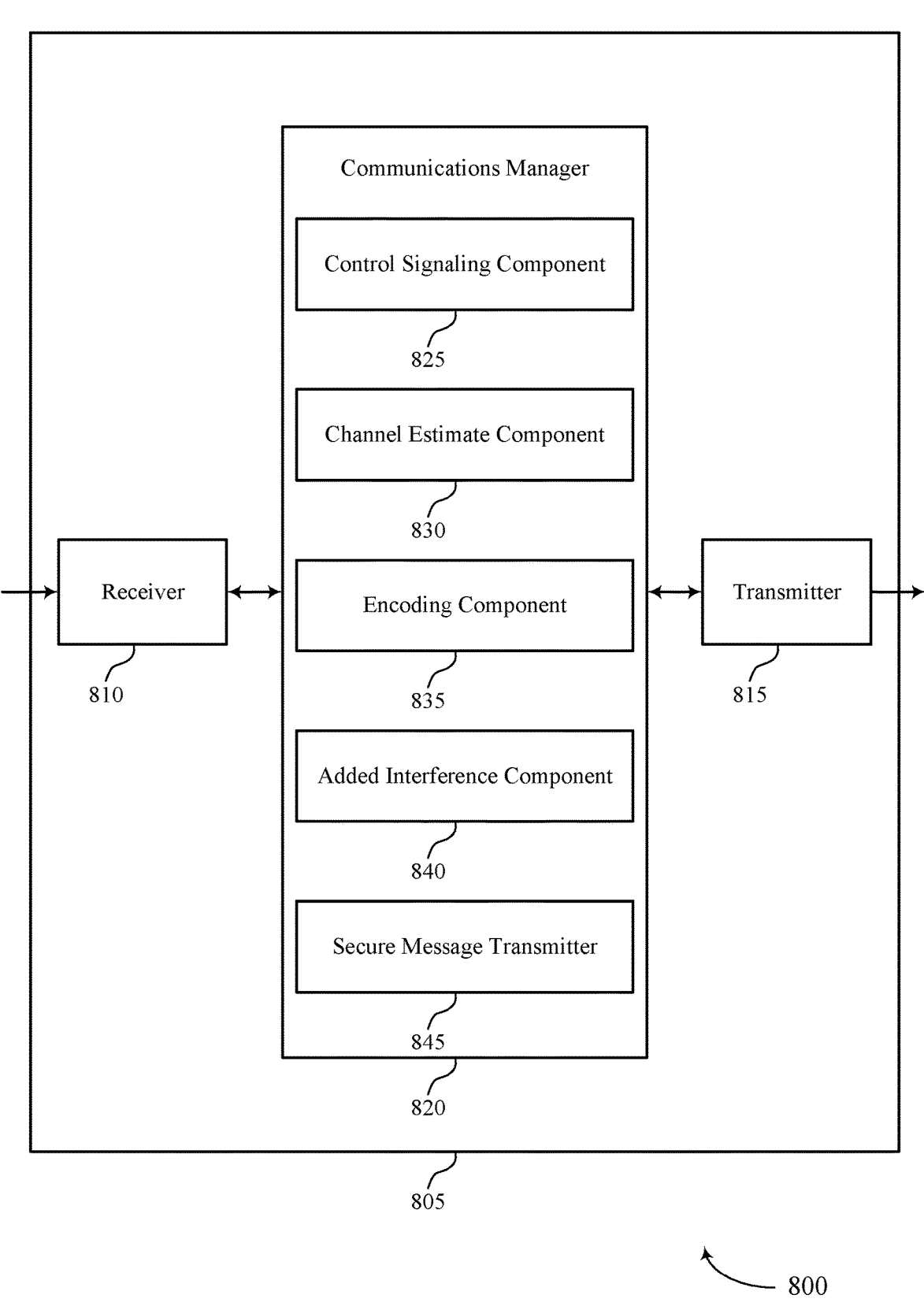

FIG. 8 shows a block diagram 800 of a device 805 that supports enhanced secrecy for OTFS waveforms at the physical layer in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of enhanced secrecy for OTFS waveforms at the physical layer as described herein. For example, the communications manager 820 may include a control signaling component 825, a channel estimate component 830, an encoding component 835, an added interference component 840, a secure message transmitter 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. The control signaling component 825 may be configured as or otherwise support a means for transmitting control signaling indicating that a secure downlink message is scheduled for transmission to a UE. The channel estimate component 830 may be configured as or otherwise support a means for receiving, in response to the control signaling, an SRS for generating a channel estimate for a channel between the network entity and the UE. The encoding component 835 may be configured as or otherwise support a means for encoding the secure downlink message in accordance with an OTFS precoding scheme. The added interference component 840 may be configured as or otherwise support a means for adding interference to the encoded secure downlink message over a slot duration, the added interference being based on the channel estimate. The secure message transmitter 845 may be configured as or otherwise support a means for transmitting, via the channel, the encoded secure downlink message that includes the added interference.

Figure 9:
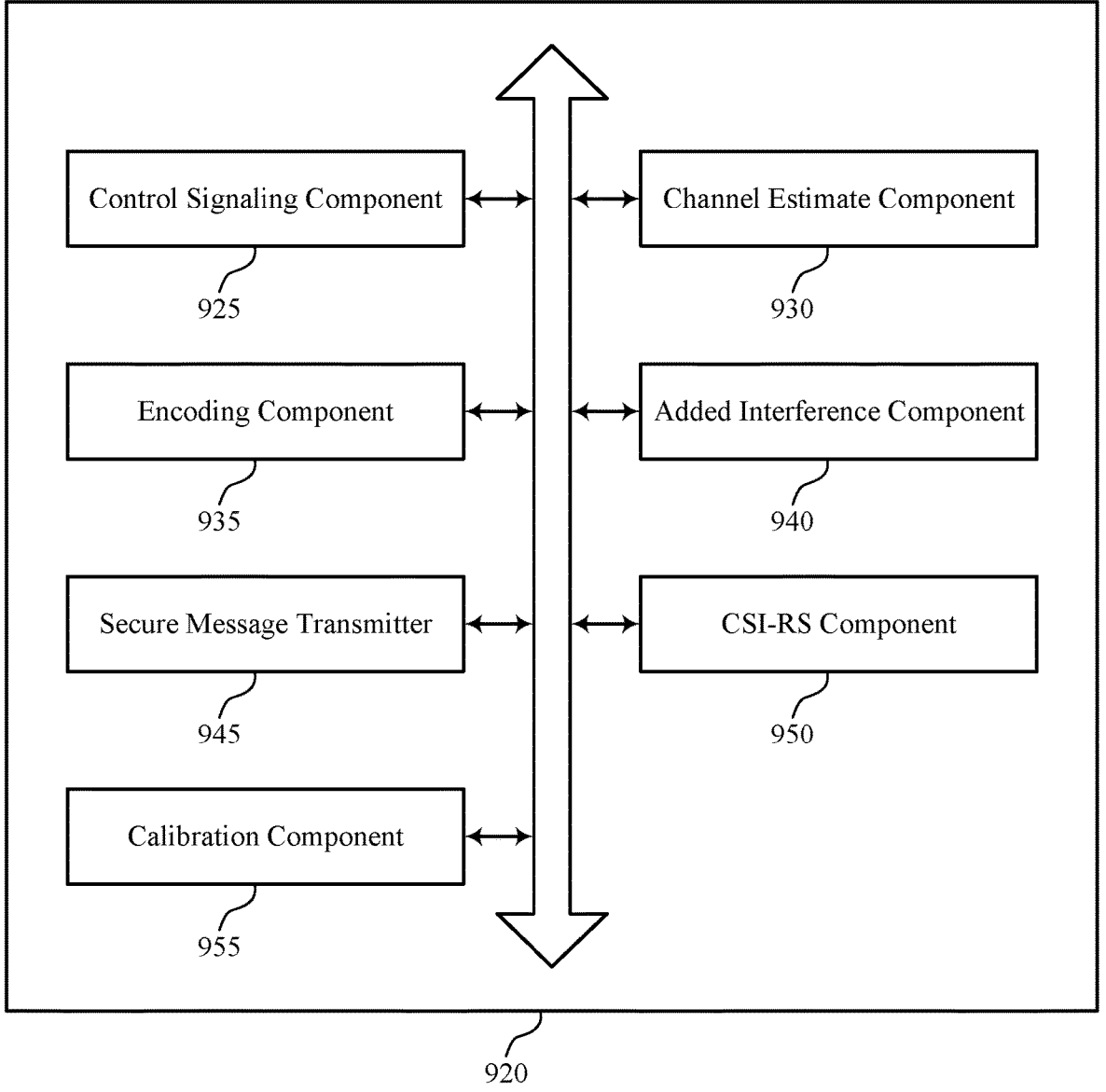
FIG. 9 shows a block diagram of a communications manager that supports enhanced secrecy for OTFS waveforms at the physical layer in accordance with one or more aspects of the present disclosure.

FIG. 9 shows a block diagram 900 of a communications manager 920 that supports enhanced secrecy for OTFS waveforms at the physical layer in accordance with one or more aspects of the present disclosure. The communications manager 920 may be an example of aspects of a communications manager 720, a communications manager 820, or both, as described herein. The communications manager 920, or various components thereof, may be an example of means for performing various aspects of enhanced secrecy for OTFS waveforms at the physical layer as described herein. For example, the communications manager 920 may include a control signaling component 925, a channel estimate component 930, an encoding component 935, an added interference component 940, a secure message transmitter 945, a CSI-RS component 950, a calibration component 955, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a network entity in accordance with examples as disclosed herein. The control signaling component 925 may be configured as or otherwise support a means for transmitting control signaling indicating that a secure downlink message is scheduled for transmission to a UE. The channel estimate component 930 may be configured as or otherwise support a means for receiving, in response to the control signaling, an SRS for generating a channel estimate for a channel between the network entity and the UE. The encoding component 935 may be configured as or otherwise support a means for encoding the secure downlink message in accordance with an OTFS precoding scheme. The added interference component 940 may be configured as or otherwise support a means for adding interference to the encoded secure downlink message over a slot duration, the added interference being based on the channel estimate. The secure message transmitter 945 may be configured as or otherwise support a means for transmitting, via the channel, the encoded secure downlink message that includes the added interference.

In some examples, the CSI-RS component 950 may be configured as or otherwise support a means for transmitting a CSI-RS. In some examples, the CSI-RS component 950 may be configured as or otherwise support a means for receiving a feedback message based on the CSI-RS. In some examples, the calibration component 955 may be configured as or otherwise support a means for determining one or more calibration coefficients based on the feedback message and the channel estimate, where encoding the secure downlink message is based on the one or more calibration coefficients.

In some examples, the one or more calibration coefficients are associated with a ratio of a first gain value to a second gain value, the first gain value including a product of a transmission channel gain at the network entity and a reception channel gain at the UE, and the second gain value including a product of a transmission channel gain at the UE and a reception channel gain at the network entity.

In some examples, the channel estimate component 930 may be configured as or otherwise support a means for generating an uplink channel estimate based on the received SRS. In some examples, the channel estimate component 930 may be configured as or otherwise support a means for generating the channel estimate for the channel based on the uplink channel estimate and a TDD configuration for communications between the network entity and the UE.

In some examples, the added interference is associated with a null space of a product of a first matrix and a second matrix, the first matrix being representative of the channel estimate and the second matrix corresponding to a cyclic prefix removal matrix. In some examples, the added interference includes a product of a vector and third matrix. In some examples, the third matrix spans the null space of the product of the first matrix and the second matrix. In some examples, the vector includes one or more values that are randomly-generated. In some examples, the vector includes one or more values that are preconfigured.

In some examples, the control signaling includes RRC signaling. In some examples, the control signaling includes DCI. In some examples, the control signaling includes a MAC-CE.

In some examples, the encoded secure downlink message includes control signaling, data signaling, a DMRS, or a combination thereof.

In some examples, the channel estimate component 930 may be configured as or otherwise support a means for generating the channel estimate in accordance with a delay-Doppler domain channel estimation scheme.

Figure 10:
FIG. 10 shows a diagram of a system including a device that supports enhanced secrecy for OTFS waveforms at the physical layer in accordance with one or more aspects of the present disclosure.

FIG. 10 shows a diagram of a system 1000 including a device 1005 that supports enhanced secrecy for OTFS waveforms at the physical layer in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include random-access memory (RAM) and read-only memory (ROM). The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting enhanced secrecy for OTFS waveforms at the physical layer). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a network entity in accordance with examples as disclosed herein. For example, the communications manager 1020 may be configured as or otherwise support a means for transmitting control signaling indicating that a secure downlink message is scheduled for transmission to a UE. The communications manager 1020 may be configured as or otherwise support a means for receiving, in response to the control signaling, an SRS for generating a channel estimate for a channel between the network entity and the UE. The communications manager 1020 may be configured as or otherwise support a means for encoding the secure downlink message in accordance with an OTFS precoding scheme. The communications manager 1020 may be configured as or otherwise support a means for adding interference to the encoded secure downlink message over a slot duration, the added interference being based on the channel estimate. The communications manager 1020 may be configured as or otherwise support a means for transmitting, via the channel, the encoded secure downlink message that includes the added interference.

By including or configuring the communications manager 1020 in accordance with examples as described herein, the device 1005 may support techniques for physical-layer security for OTFS waveforms. For example, the device 1005 may add channel-based interference to an OTFS-precoded transmission, which may enable enhanced secrecy in high-Doppler scenarios without increasing overhead or latency and thereby improve communication reliability and coordination between devices. Additionally, malicious receivers may be unable to intercept the secure OTFS-precoded transmission, which may improve security and communication reliability. Thus, the described security techniques may improve security and enhance secrecy while avoiding power consumption and processing associated with OFDM channel-based security in high-Doppler scenarios.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of enhanced secrecy for OTFS waveforms at the physical layer as described herein, or the processor 1035 and the memory 1025 may be otherwise configured to perform or support such operations.

Figure 11:
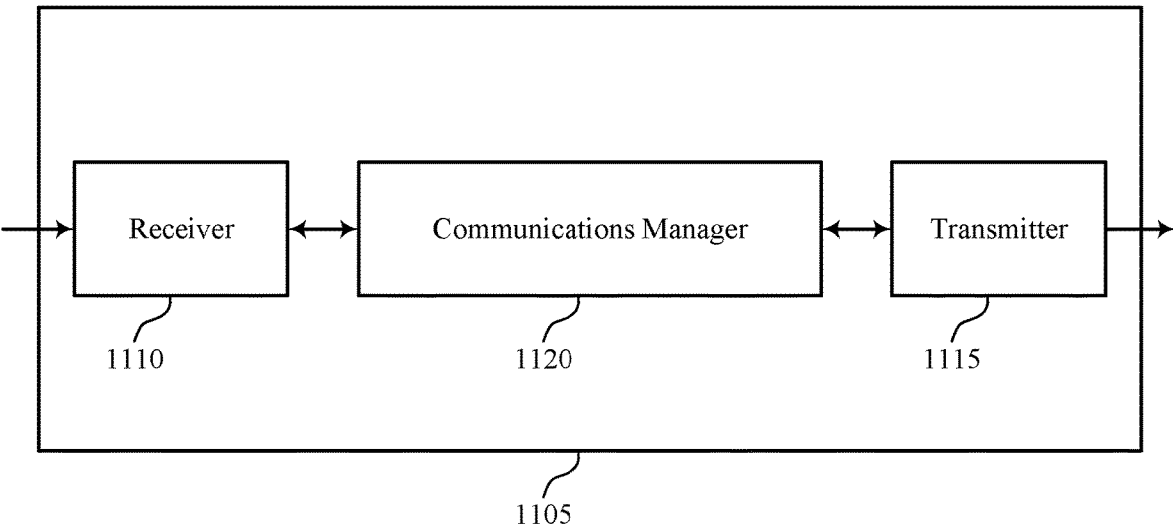
FIGS. 11 and 12 show block diagrams of devices that support enhanced secrecy for OTFS waveforms at the physical layer in accordance with one or more aspects of the present disclosure.

FIG. 11 shows a block diagram 1100 of a device 1105 that supports enhanced secrecy for OTFS waveforms at the physical layer in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to enhanced secrecy for OTFS waveforms at the physical layer). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to enhanced secrecy for OTFS waveforms at the physical layer). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of enhanced secrecy for OTFS waveforms at the physical layer as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. For example, the communications manager 1120 may be configured as or otherwise support a means for receiving control signaling indicating that a secure downlink message is scheduled for transmission from a network entity. The communications manager 1120 may be configured as or otherwise support a means for transmitting, in response to the control signaling, an SRS for generating a channel estimate for a channel between the network entity and the UE. The communications manager 1120 may be configured as or otherwise support a means for receiving, via the channel, the secure downlink message that includes added interference over a slot duration, the added interference being based on the channel estimate, where the secure downlink message is encoded in accordance with an OTFS precoding scheme. The communications manager 1120 may be configured as or otherwise support a means for decoding the secure downlink message in accordance with the OTFS precoding scheme.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for physical-layer security for OTFS waveforms. For example, the device 1105 may be capable of removing channel-based added interference from an OTFS-precoded transmission, which may enable enhanced secrecy in high-Doppler scenarios without increasing overhead or latency, in turn reducing processing and power consumption.

Figure 12:
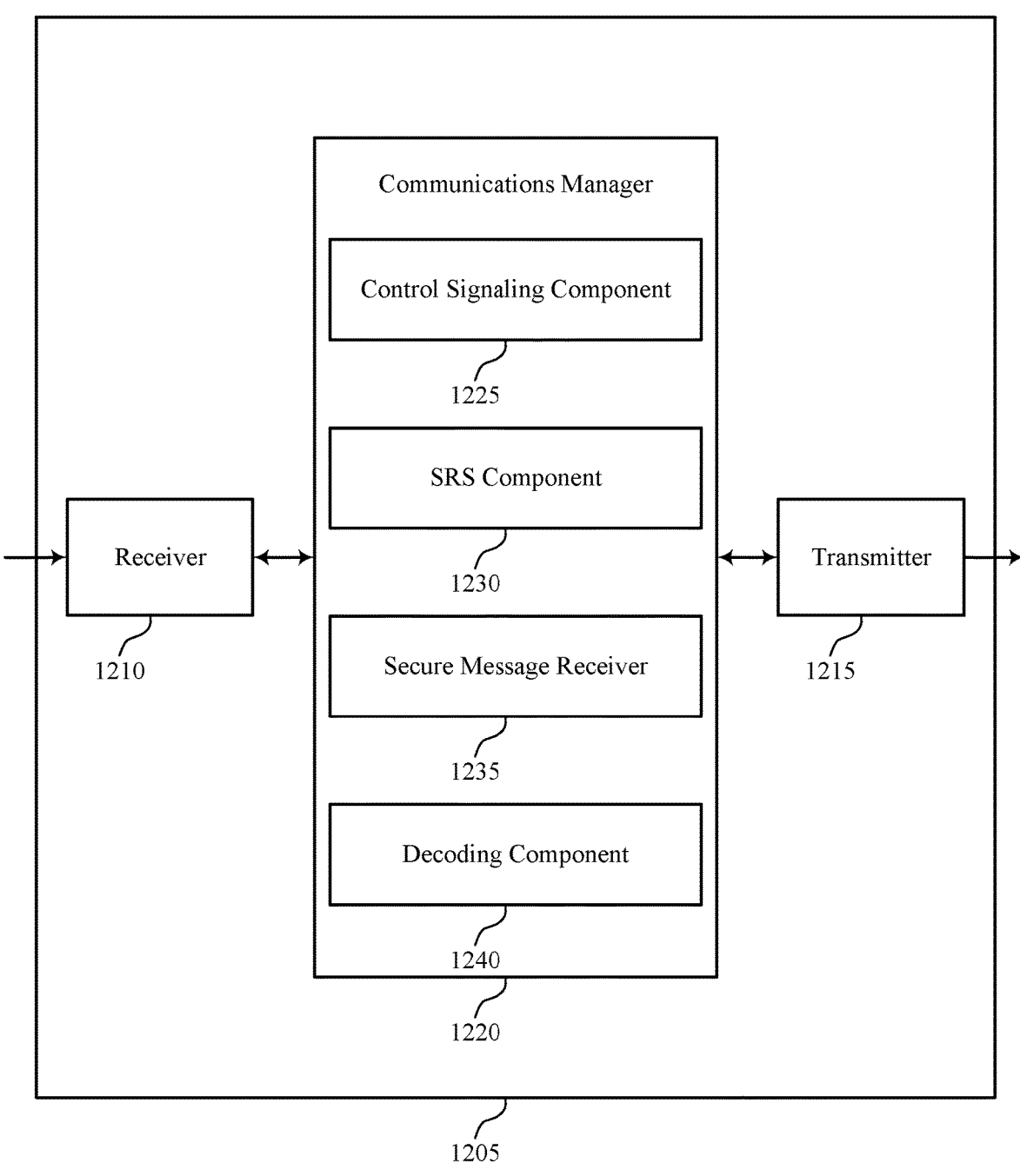

FIG. 12 shows a block diagram 1200 of a device 1205 that supports enhanced secrecy for OTFS waveforms at the physical layer in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to enhanced secrecy for OTFS waveforms at the physical layer). Information may be passed on to other components of the device 1205. The receiver 1210 may utilize a single antenna or a set of multiple antennas.

The transmitter 1215 may provide a means for transmitting signals generated by other components of the device

1205. For example, the transmitter 1215 may transmit information such as packets, user data, control information, or any combination thereof associated with various information channels (e.g., control channels, data channels, information channels related to enhanced secrecy for OTFS waveforms at the physical layer). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of enhanced secrecy for OTFS waveforms at the physical layer as described herein. For example, the communications manager 1220 may include a control signaling component 1225, an SRS component 1230, a secure message receiver 1235, a decoding component 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. The control signaling component 1225 may be configured as or otherwise support a means for receiving control signaling indicating that a secure downlink message is scheduled for transmission from a network entity. The SRS component 1230 may be configured as or otherwise support a means for transmitting, in response to the control signaling, an SRS for generating a channel estimate for a channel between the network entity and the UE. The secure message receiver 1235 may be configured as or otherwise support a means for receiving, via the channel, the secure downlink message that includes added interference over a slot duration, the added interference being based on the channel estimate, where the secure downlink message is encoded in accordance with an OTFS precoding scheme. The decoding component 1240 may be configured as or otherwise support a means for decoding the secure downlink message in accordance with the OTFS precoding scheme.

Figure 13:
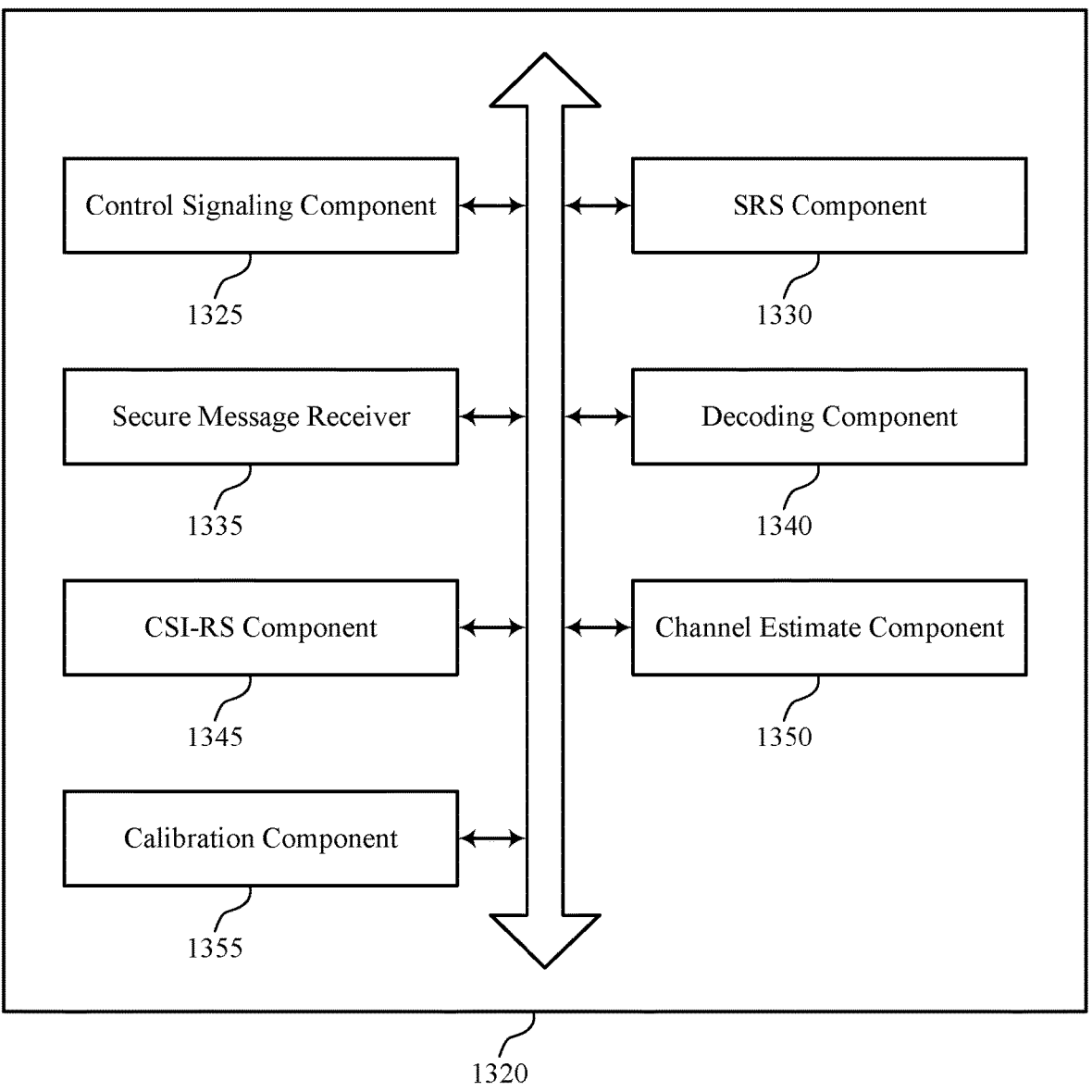
FIG. 13 shows a block diagram of a communications manager that supports enhanced secrecy for OTFS waveforms at the physical layer in accordance with one or more aspects of the present disclosure.

FIG. 13 shows a block diagram 1300 of a communications manager 1320 that supports enhanced secrecy for OTFS waveforms at the physical layer in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of enhanced secrecy for OTFS waveforms at the physical layer as described herein. For example, the communications manager 1320 may include a control signaling component 1325, an SRS component 1330, a secure message receiver 1335, a decoding component 1340, a CSI-RS component 1345, a channel estimate component 1350, a calibration component 1355, or any combination thereof. Each of these components may communicate, directly or indirectly, with one another (e.g., via one or more buses).

The communications manager 1320 may support wireless communications at a UE in accordance with examples as disclosed herein. The control signaling component 1325 may be configured as or otherwise support a means for receiving control signaling indicating that a secure downlink message is scheduled for transmission from a network entity. The SRS component 1330 may be configured as or otherwise support a means for transmitting, in response to the control signaling, an SRS for generating a channel estimate for a channel between the network entity and the UE. The secure message receiver 1335 may be configured as or otherwise support a means for receiving, via the channel, the secure downlink message that includes added interference over a slot duration, the added interference being based on the channel estimate, where the secure downlink message is encoded in accordance with an OTFS precoding scheme. The decoding component 1340 may be configured as or otherwise support a means for decoding the secure downlink message in accordance with the OTFS precoding scheme.

In some examples, the CSI-RS component 1345 may be configured as or otherwise support a means for receiving one or more CSI-RSs. In some examples, the channel estimate component 1350 may be configured as or otherwise support a means for generating a downlink channel estimate for the channel based on the received one or more CSI-RSs. In some examples, the channel estimate component 1350 may be configured as or otherwise support a means for transmitting a feedback message indicating the downlink channel estimate for one or more calibration coefficients applied to the channel estimate.

In some examples, the CSI-RS component 1345 may be configured as or otherwise support a means for receiving, with the secure downlink message, one or more CSI-RSs. In some examples, the calibration component 1355 may be configured as or otherwise support a means for determining one or more calibration coefficients based on a downlink channel estimate generated using the one or more CSI-RSs, where decoding the secure downlink message is based on the one or more calibration coefficients.

In some examples, the one or more calibration coefficients are associated with a ratio of a first gain value to a second gain value, the first gain value including a product of a transmission channel gain at the network entity and a reception channel gain at the UE, and the second gain value including a product of a transmission channel gain at the UE and a reception channel gain at the network entity.

In some examples, the added interference is associated with a null space of a product of a first matrix and a second matrix, the first matrix being representative of the channel estimate and the second matrix corresponding to a cyclic prefix removal matrix. In some examples, the added interference includes a product of a vector and third matrix. In some examples, the third matrix spans the null space of the product of the first matrix and the second matrix. In some examples, the vector includes one or more values that are randomly-generated. In some examples, the vector includes one or more values that are preconfigured.

In some examples, the control signaling includes RRC signaling. In some examples, the control signaling includes DCI. In some examples, the control signaling includes a MAC-CE.

In some examples, the secure downlink message includes control signaling, data signaling, a DMRS, or a combination thereof.

Figure 14:
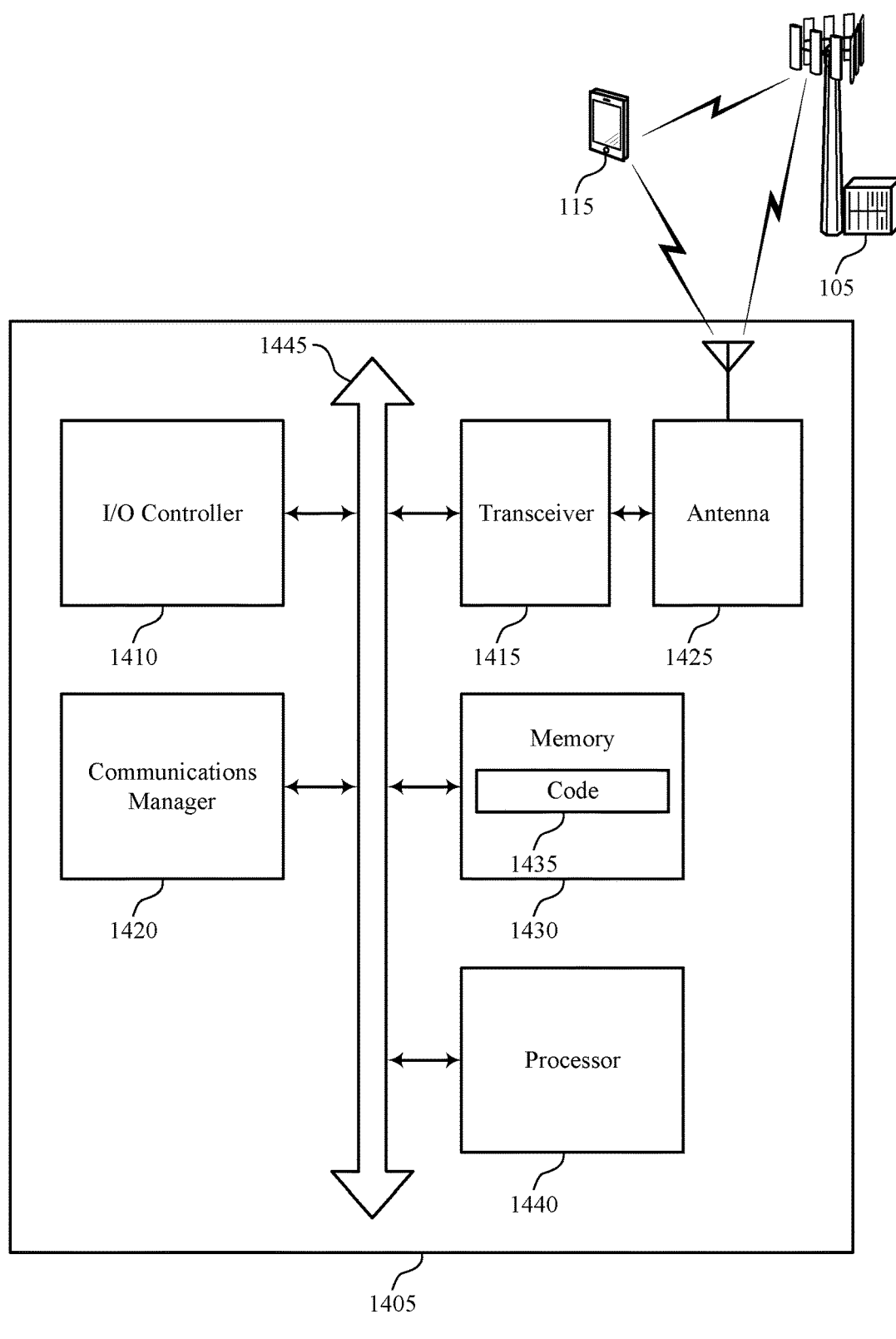
FIG. 14 shows a diagram of a system including a device that supports enhanced secrecy for OTFS waveforms at the physical layer in accordance with one or more aspects of the present disclosure.

FIG. 14 shows a diagram of a system 1400 including a device 1405 that supports enhanced secrecy for OTFS waveforms at the physical layer in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WIN-DOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting enhanced secrecy for OTFS waveforms at the physical layer). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a UE in accordance with examples as disclosed herein. For example, the communications manager 1420 may be configured as or otherwise support a means for receiving control signaling indicating that a secure downlink message is scheduled for transmission from a network entity. The communications manager 1420 may be configured as or otherwise support a means for transmitting, in response to the control signaling, an SRS for generating a channel estimate for a channel between the network entity and the UE. The communications manager 1420 may be configured as or otherwise support a means for receiving, via the channel, the secure downlink message that includes added interference over a slot duration, the added interference being based on the channel estimate, where the secure downlink message is encoded in accordance with an OTFS precoding scheme. The communications manager 1420 may be configured as or otherwise support a means for decoding the secure downlink message in accordance with the OTFS precoding scheme.

By including or configuring the communications manager 1420 in accordance with examples as described herein, the device 1405 may support techniques for physical-layer security for OTFS waveforms. For example, the device 1405 may be capable of removing added channel-based interference from an OTFS-precoded transmission, which may enable enhanced secrecy in high-Doppler scenarios without increasing overhead or latency and thereby improve communication reliability and coordination between devices. Additionally, the described security techniques may improve security and enhance secrecy while avoiding power consumption and processing associated with OFDM channel-based security in high-Doppler scenarios.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of enhanced secrecy for OTFS waveforms at the physical layer as described herein, or the processor 1440 and the memory 1430 may be otherwise configured to perform or support such operations.

FIG. 15 shows a flowchart illustrating a method 1500 that supports enhanced secrecy for OTFS waveforms at the physical layer in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling indicating that a secure downlink message is scheduled for transmission to a UE. The operations of 1505 may be performed in accordance with examples as disclosed herein. In some examples, aspects of the operations of 1505 may be performed by a control signaling component 925 as described with reference to FIG. 9.

At 1510, the method may include receiving, in response to the control signaling, an SRS for generating a channel estimate for a channel between the network entity and the UE. The operations of 1510 may be performed in accordance with examples as disclosed herein. In some examples, aspects of the operations of 1510 may be performed by a channel estimate component 930 as described with reference to FIG. 9.

At 1515, the method may include encoding the secure downlink message in accordance with an OTFS precoding scheme. The operations of 1515 may be performed in accordance with examples as disclosed herein. In some examples, aspects of the operations of 1515 may be performed by an encoding component 935 as described with reference to FIG. 9.

At 1520, the method may include adding interference to the encoded secure downlink message over a slot duration, the added interference being based on the channel estimate. The operations of 1520 may be performed in accordance with examples as disclosed herein. In some examples, aspects of the operations of 1520 may be performed by an added interference component 940 as described with reference to FIG. 9.

At 1525, the method may include transmitting, via the channel, the encoded secure downlink message that includes the added interference. The operations of 1525 may be performed in accordance with examples as disclosed herein. In some examples, aspects of the operations of 1525 may be performed by a secure message transmitter 945 as described with reference to FIG. 9.

FIG. 16 shows a flowchart illustrating a method 1600 that supports enhanced secrecy for OTFS waveforms at the physical layer in accordance with one or more aspects of the present disclosure. The operations of the method 1600 may be implemented by a network entity or its components as described herein. For example, the operations of the method 1600 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling indicating that a secure downlink message is scheduled for transmission to a UE. The operations of 1605 may be performed in accordance with examples as disclosed herein. In some examples, aspects of the operations of 1605 may be performed by a control signaling component 925 as described with reference to FIG. 9.

At 1610, the method may include receiving, in response to the control signaling, an SRS for generating a channel estimate for a channel between the network entity and the UE. The operations of 1610 may be performed in accordance with examples as disclosed herein. In some examples, aspects of the operations of 1610 may be performed by a channel estimate component 930 as described with reference to FIG. 9.

At 1615, the method may include generating an uplink channel estimate based on the received SRS. The operations of 1615 may be performed in accordance with examples as disclosed herein. In some examples, aspects of the operations of 1615 may be performed by a channel estimate component 930 as described with reference to FIG. 9.

At 1620, the method may include generating the channel estimate for the channel based on the uplink channel estimate and a TDD configuration for communications between the network entity and the UE. The operations of 1620 may be performed in accordance with examples as disclosed herein. In some examples, aspects of the operations of 1620 may be performed by a channel estimate component 930 as described with reference to FIG. 9.

At 1625, the method may include encoding the secure downlink message in accordance with an OTFS precoding scheme. The operations of 1625 may be performed in accordance with examples as disclosed herein. In some examples, aspects of the operations of 1625 may be performed by an encoding component 935 as described with reference to FIG. 9.

At 1630, the method may include adding interference to the encoded secure downlink message over a slot duration, the added interference being based on the channel estimate. The operations of 1630 may be performed in accordance with examples as disclosed herein. In some examples, aspects of the operations of 1630 may be performed by an added interference component 940 as described with reference to FIG. 9.

At 1635, the method may include transmitting, via the channel, the encoded secure downlink message that includes the added interference. The operations of 1635 may be performed in accordance with examples as disclosed herein. In some examples, aspects of the operations of 1635 may be performed by a secure message transmitter 945 as described with reference to FIG. 9.

FIG. 17 shows a flowchart illustrating a method 1700 that supports enhanced secrecy for OTFS waveforms at the physical layer in accordance with one or more aspects of the present disclosure. The operations of the method 1700 may be implemented by a UE or its components as described herein. For example, the operations of the method 1700 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1705, the method may include receiving control signaling indicating that a secure downlink message is scheduled for transmission from a network entity. The operations of 1705 may be performed in accordance with examples as disclosed herein. In some examples, aspects of the operations of 1705 may be performed by a control signaling component 1325 as described with reference to FIG. 13.

At 1710, the method may include transmitting, in response to the control signaling, an SRS for generating a channel estimate for a channel between the network entity and the UE. The operations of 1710 may be performed in accordance with examples as disclosed herein. In some examples, aspects of the operations of 1710 may be performed by an SRS component 1330 as described with reference to FIG. 13.

At 1715, the method may include receiving, via the channel, the secure downlink message that includes added interference over a slot duration, the added interference being based on the channel estimate, where the secure downlink message is encoded in accordance with an OTFS precoding scheme. The operations of 1715 may be performed in accordance with examples as disclosed herein. In some examples, aspects of the operations of 1715 may be performed by a secure message receiver 1335 as described with reference to FIG. 13.

At 1720, the method may include decoding the secure downlink message in accordance with the OTFS precoding scheme. The operations of 1720 may be performed in accordance with examples as disclosed herein. In some examples, aspects of the operations of 1720 may be performed by a decoding component 1340 as described with reference to FIG. 13.

Figure 18:
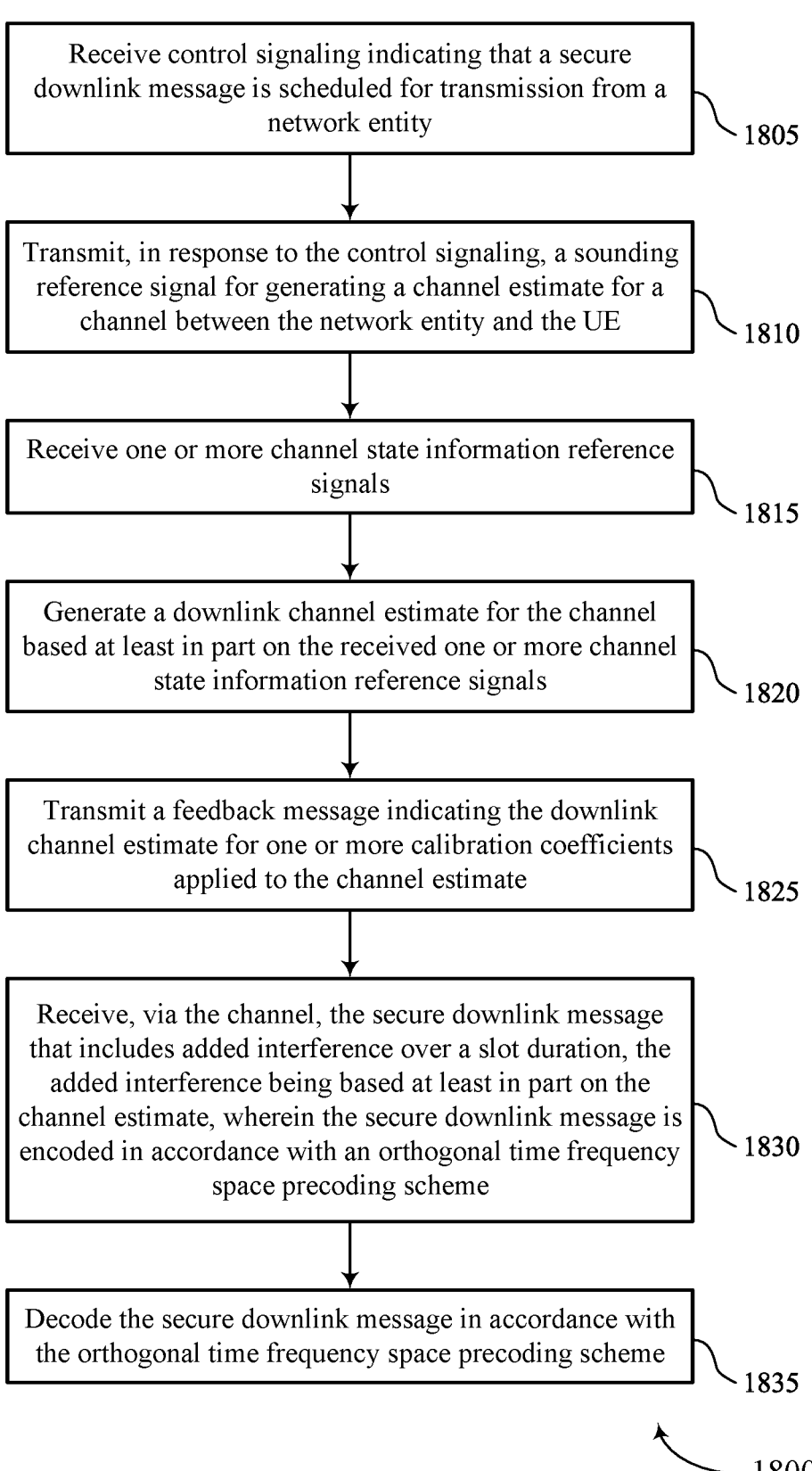

FIG. 18 shows a flowchart illustrating a method 1800 that supports enhanced secrecy for OTFS waveforms at the physical layer in accordance with one or more aspects of the present disclosure. The operations of the method 1800 may be implemented by a UE or its components as described herein. For example, the operations of the method 1800 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1805, the method may include receiving control signaling indicating that a secure downlink message is scheduled for transmission from a network entity. The operations of 1805 may be performed in accordance with examples as disclosed herein. In some examples, aspects of the operations of 1805 may be performed by a control signaling component 1325 as described with reference to FIG. 13.

At 1810, the method may include transmitting, in response to the control signaling, an SRS for generating a channel estimate for a channel between the network entity and the UE. The operations of 1810 may be performed in accordance with examples as disclosed herein. In some examples, aspects of the operations of 1810 may be performed by an SRS component 1330 as described with reference to FIG. 13.

At 1815, the method may include receiving one or more CSI-RSs. The operations of 1815 may be performed in accordance with examples as disclosed herein. In some examples, aspects of the operations of 1815 may be performed by a CSI-RS component 1345 as described with reference to FIG. 13.

At 1820, the method may include generating a downlink channel estimate for the channel based on the received one or more CSI-RSs. The operations of 1820 may be performed in accordance with examples as disclosed herein. In some examples, aspects of the operations of 1820 may be performed by a channel estimate component 1350 as described with reference to FIG. 13.

At 1825, the method may include transmitting a feedback message indicating the downlink channel estimate for one or more calibration coefficients applied to the channel estimate. The operations of 1825 may be performed in accordance with examples as disclosed herein. In some examples, aspects of the operations of 1825 may be performed by a channel estimate component 1350 as described with reference to FIG. 13.

At 1830, the method may include receiving, via the channel, the secure downlink message that includes added interference over a slot duration, the added interference being based on the channel estimate, where the secure downlink message is encoded in accordance with an OTFS precoding scheme. The operations of 1830 may be performed in accordance with examples as disclosed herein. In some examples, aspects of the operations of 1830 may be performed by a secure message receiver 1335 as described with reference to FIG. 13.

At 1835, the method may include decoding the secure downlink message in accordance with the OTFS precoding scheme. The operations of 1835 may be performed in accordance with examples as disclosed herein. In some examples, aspects of the operations of 1835 may be performed by a decoding component 1340 as described with reference to FIG. 13.

The following provides an overview of aspects of the present disclosure:

Aspect 1: A method for wireless communications at a network entity, comprising: transmitting control signaling indicating that a secure downlink message is scheduled for transmission to a UE; receiving, in response to the control signaling, an SRS for generating a channel estimate for a channel between the network entity and the UE; encoding the secure downlink message in accordance with an OTFS precoding scheme; adding interference to the encoded secure downlink message over a slot duration, the added interference being based at least in part on the channel estimate; and transmitting, via the channel, the encoded secure downlink message that includes the added interference.

Aspect 2: The method of aspect 1, further comprising: transmitting a CSI-RS; receiving a feedback message based at least in part on the CSI-RS; and determining one or more calibration coefficients based at least in part on the feedback message and the channel estimate, wherein encoding the secure downlink message is based at least in part on the one or more calibration coefficients.

Aspect 3: The method of aspect 2, wherein the one or more calibration coefficients are associated with a ratio of a first gain value to a second gain value, the first gain value comprising a product of a transmission channel gain at the network entity and a reception channel gain at the UE, and the second gain value comprising a product of a transmission channel gain at the UE and a reception channel gain at the network entity.

Aspect 4: The method of any of aspects 1 through 3, further comprising: generating an uplink channel estimate based at least in part on the received SRS; and generating the channel estimate for the channel based at least in part on the uplink channel estimate and a TDD configuration for communications between the network entity and the UE.

Aspect 5: The method of any of aspects 1 through 4, wherein the added interference is associated with a null space of a product of a first matrix and a second matrix, the first matrix being representative of the channel estimate and the second matrix corresponding to a cyclic prefix removal matrix.

Aspect 6: The method of aspect 5, wherein the added interference comprises a product of a vector and third matrix, the third matrix spans the null space of the product of the first matrix and the second matrix.

Aspect 7: The method of aspect 6, wherein the vector comprises one or more values that are randomly-generated.

Aspect 8: The method of aspect 6, wherein the vector comprises one or more values that are preconfigured.

Aspect 9: The method of any of aspects 1 through 8, wherein the control signaling comprises RRC signaling.

Aspect 10: The method of any of aspects 1 through 8, wherein the control signaling comprises DCI.

Aspect 11: The method of any of aspects 1 through 8, wherein the control signaling comprises a MAC-CE.

Aspect 12: The method of any of aspects 1 through 11, wherein the encoded secure downlink message includes control signaling, data signaling, a demodulation reference signal, or a combination thereof.

Aspect 13: The method of any of aspects 1 through 12, further comprising: generating the channel estimate in accordance with a delay-Doppler domain channel estimation scheme.

Aspect 14: A method for wireless communications at a UE, comprising: receiving control signaling indicating that a secure downlink message is scheduled for transmission from a network entity; transmitting, in response to the control signaling, an SRS for generating a channel estimate for a channel between the network entity and the UE; receiving, via the channel, the secure downlink message that includes added interference over a slot duration, the added interference being based at least in part on the channel estimate, wherein the secure downlink message is encoded in accordance with an OTFS precoding scheme; and decoding the secure downlink message in accordance with the OTFS precoding scheme.

Aspect 15: The method of aspect 14, further comprising: receiving one or more CSI-RSs; generating a downlink channel estimate for the channel based at least in part on the received one or more CSI-RSs; and transmitting a feedback message indicating the downlink channel estimate for one or more calibration coefficients applied to the channel estimate.

Aspect 16: The method of any of aspects 14 through 15, further comprising: receiving, with the secure downlink message, one or more CSI-RSs; and determining one or more calibration coefficients based at least in part on a downlink channel estimate generated using the one or more CSI-RSs, wherein decoding the secure downlink message is based at least in part on the one or more calibration coefficients.

Aspect 17: The method of any of aspects 14 through 16, wherein the one or more calibration coefficients are associated with a ratio of a first gain value to a second gain value, the first gain value comprising a product of a transmission channel gain at the network entity and a reception channel gain at the UE, and the second gain value comprising a product of a transmission channel gain at the UE and a reception channel gain at the network entity.

Aspect 18: The method of any of aspects 14 through 17, wherein the added interference is associated with a null space of a product of a first matrix and a second matrix, the first matrix being representative of the channel estimate and the second matrix corresponding to a cyclic prefix removal matrix.

Aspect 19: The method of aspect 18, wherein the added interference comprises a product of a vector and third matrix, the third matrix spans the null space of the product of the first matrix and the second matrix.

Aspect 20: The method of aspect 19, wherein the vector comprises one or more values that are randomly-generated.

Aspect 21: The method of aspect 19, wherein the vector comprises one or more values that are preconfigured.

Aspect 22: The method of any of aspects 14 through 21, wherein the control signaling comprises RRC signaling.

Aspect 23: The method of any of aspects 14 through 21, wherein the control signaling comprises DCI.

Aspect 24: The method of any of aspects 14 through 21, wherein the control signaling comprises a MAC-CE.

Aspect 25: The method of any of aspects 14 through 24, wherein the secure downlink message includes control signaling, data signaling, a demodulation reference signal, or a combination thereof.

Aspect 26: An apparatus for wireless communications at a network entity, comprising a processor; memory coupled with the processor; and instructions stored in the memory and executable by the processor to cause the apparatus to perform a method of any of aspects 1 through 13.

Aspect 27: An apparatus for wireless communications at a network entity, comprising at least one means for performing a method of any of aspects 1 through 13.

Aspect 28: A non-transitory computer-readable medium storing code for wireless communications at a network entity, the code comprising instructions executable by a processor to perform a method of any of aspects 1 through 13.

Aspect 29: An apparatus for wireless communications at a UE, comprising a processor; memory coupled with the processor; and instructions stored in the memory and executable by the processor to cause the apparatus to perform a method of any of aspects 14 through 25.

Aspect 30: An apparatus for wireless communications at a UE, comprising at least one means for performing a method of any of aspects 14 through 25.

Aspect 31: A non-transitory computer-readable medium storing code for wireless communications at a UE, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network entity, comprising:

transmitting control signaling indicating that a secure downlink message is scheduled for transmission to a user equipment (UE);

receiving, in response to the control signaling, a sounding reference signal for generating a channel estimate for a channel between the network entity and the UE, wherein the channel estimate is generated in accordance with a delay-Doppler domain channel estimation scheme;

encoding the secure downlink message in accordance with an orthogonal time frequency space precoding scheme based at least in part on the delay-Doppler domain channel estimation scheme;

adding interference to the encoded secure downlink message over a slot duration, the added interference being based at least in part on the channel estimate; and transmitting, via the channel, the encoded secure downlink message that includes the added interference.

2. The method of claim 1, further comprising:

transmitting a channel state information reference signal;

receiving a feedback message based at least in part on the channel state information reference signal; and determining one or more calibration coefficients based at least in part on the feedback message and the channel estimate, wherein encoding the secure downlink message is based at least in part on the one or more calibration coefficients.

3. The method of claim 2, wherein the one or more calibration coefficients are associated with a ratio of a first gain value to a second gain value, the first gain value comprising a product of a transmission channel gain at the network entity and a reception channel gain at the UE, and the second gain value comprising a product of a transmission channel gain at the UE and a reception channel gain at the network entity.

4. The method of claim 1, further comprising:

generating an uplink channel estimate based at least in part on the received sounding reference signal; and generating the channel estimate for the channel based at least in part on the uplink channel estimate and a time domain duplexing configuration for communications between the network entity and the UE.

5. The method of claim 1, wherein the added interference is associated with a null space of a product of a first matrix and a second matrix, the first matrix being representative of the channel estimate and the second matrix corresponding to a cyclic prefix removal matrix.

6. The method of claim 5, wherein the added interference comprises a product of a vector and third matrix, and the third matrix spans the null space of the product of the first matrix and the second matrix.

7. The method of claim 6, wherein the vector comprises one or more values that are randomly-generated.

8. The method of claim 6, wherein the vector comprises one or more values that are preconfigured.

9. The method of claim 1, wherein the control signaling comprises radio resource control signaling.

10. The method of claim 1, wherein the control signaling comprises downlink control information.

11. The method of claim 1, wherein the control signaling comprises a medium access control (MAC) control element.

12. The method of claim 1, wherein the encoded secure downlink message includes control signaling, data signaling, a demodulation reference signal, or a combination thereof.

13. A method for wireless communications at a user equipment (UE), comprising:

receiving control signaling indicating that a secure downlink message is scheduled for transmission from a network entity;

transmitting, in response to the control signaling, a sounding reference signal for generating a channel estimate for a channel between the network entity and the UE in accordance with a delay-Doppler domain channel estimation scheme;

receiving, via the channel, the secure downlink message that includes added interference over a slot duration, the added interference being based at least in part on the channel estimate, wherein the secure downlink message is encoded in accordance with an orthogonal time frequency space precoding scheme based at least in part on the delay-Doppler domain channel estimation scheme; and decoding the secure downlink message in accordance with the orthogonal time frequency space precoding scheme.

14. The method of claim 13, further comprising:

receiving one or more channel state information reference signals;

generating a downlink channel estimate for the channel based at least in part on the received one or more channel state information reference signals; and transmitting a feedback message indicating the downlink channel estimate for one or more calibration coefficients applied to the channel estimate.

15. The method of claim 13, further comprising:

receiving, with the secure downlink message, one or more channel state information reference signals; and determining one or more calibration coefficients based at least in part on a downlink channel estimate generated using the one or more channel state information reference signals, wherein decoding the secure downlink message is based at least in part on the one or more calibration coefficients.

16. The method of claim 15, wherein the one or more calibration coefficients are associated with a ratio of a first gain value to a second gain value, the first gain value comprising a product of a transmission channel gain at the network entity and a reception channel gain at the UE, and the second gain value comprising a product of a transmission channel gain at the UE and a reception channel gain at the network entity.

17. The method of claim 13, wherein the added interference is associated with a null space of a product of a first matrix and a second matrix, the first matrix being representative of the channel estimate and the second matrix corresponding to a cyclic prefix removal matrix.

18. The method of claim 17, wherein the added interference comprises a product of a vector and third matrix, and the third matrix spans the null space of the product of the first matrix and the second matrix.

19. The method of claim 18, wherein the vector comprises one or more values that are randomly-generated.

20. The method of claim 18, wherein the vector comprises one or more values that are preconfigured.

21. The method of claim 13, wherein the control signaling comprises radio resource control signaling.

22. The method of claim 13, wherein the control signaling comprises downlink control information.

23. The method of claim 13, wherein the control signaling comprises a medium access control (MAC) control element.

24. The method of claim 13, wherein the secure downlink message includes control signaling, data signaling, a demodulation reference signal, or a combination thereof.

25. An apparatus for wireless communications at a network entity, comprising:

one or more processors;

one or more memories coupled with the one or more processors; and instructions stored in the one or more memories and executable by the one or more processors to cause the apparatus to:

transmit control signaling indicating that a secure downlink message is scheduled for transmission to a user equipment (UE);

receive, in response to the control signaling, a sounding reference signal for generating a channel estimate for a channel between the network entity and the UE, wherein the channel estimate is generated in accordance with a delay-Doppler domain channel estimation scheme;

encode the secure downlink message in accordance with an orthogonal time frequency space precoding scheme based at least in part on the delay-Doppler domain channel estimation scheme;

add interference to the encoded secure downlink message over a slot duration, the added interference being based at least in part on the channel estimate; and transmit, via the channel, the encoded secure downlink message that includes the added interference.

26. The apparatus of claim 25, wherein the instructions are further executable by the one or more processors to cause the apparatus to:

transmit a channel state information reference signal;

receive a feedback message based at least in part on the channel state information reference signal; and determine one or more calibration coefficients based at least in part on the feedback message and the channel estimate, wherein encoding the secure downlink message is based at least in part on the one or more calibration coefficients.

27. The apparatus of claim 26, wherein the one or more calibration coefficients are associated with a ratio of a first gain value to a second gain value, the first gain value comprising a product of a transmission channel gain at the network entity and a reception channel gain at the UE, and the second gain value comprising a product of a transmission channel gain at the UE and a reception channel gain at the network entity.

28. An apparatus for wireless communications at a user equipment (UE), comprising:

one or more processors;

one or more memories coupled with the one or more processors; and instructions stored in the one or more memories and executable by the one or more processors to cause the apparatus to:

receive control signaling indicating that a secure downlink message is scheduled for transmission from a network entity;

transmit, in response to the control signaling, a sounding reference signal for generating a channel estimate for a channel between the network entity and the UE in accordance with a delay-Doppler domain channel estimation scheme;

receive, via the channel, the secure downlink message that includes added interference over a slot duration, the added interference being based at least in part on the channel estimate, wherein the secure downlink message is encoded in accordance with an orthogonal time frequency space precoding scheme based at least in part on the delay-Doppler domain channel estimation scheme; and decode the secure downlink message in accordance with the orthogonal time frequency space precoding scheme.

29. The apparatus of claim 28, wherein the instructions are further executable by the one or more processors to cause the apparatus to:

receive one or more channel state information reference signals;

generate a downlink channel estimate for the channel based at least in part on the received one or more channel state information reference signals; and transmit a feedback message indicating the downlink channel estimate for one or more calibration coefficients applied to the channel estimate.

* * * * *